(12) United States Patent
Siminoff

(10) Patent No.: US 10,762,754 B2
(45) Date of Patent: Sep. 1, 2020

(54) SHARING VIDEO FOOTAGE FROM AUDIO/VIDEO RECORDING AND COMMUNICATION DEVICES FOR PARCEL THEFT DETERRENCE

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/240,735

(22) Filed: Jan. 5, 2019

(65) Prior Publication Data

US 2019/0139380 A1     May 9, 2019

Related U.S. Application Data

(63) Continuation of application No. 15/948,772, filed on Apr. 9, 2018, now Pat. No. 10,210,727, which is a
(Continued)

(51) Int. Cl.
   *G08B 13/14*            (2006.01)
   *G08B 13/196*         (2006.01)
(Continued)

(52) U.S. Cl.
   CPC ........ *G08B 13/196* (2013.01); *E05B 73/0023* (2013.01); *G06K 9/00288* (2013.01);
(Continued)

(58) Field of Classification Search
   CPC ........................ G08B 13/196; E05B 73/0023
(Continued)

(56) References Cited

U.S. PATENT DOCUMENTS 4,764,953 A     8/1988    Chern et al.
5,428,388 A     6/1995    von Bauer et al.
(Continued)

FOREIGN PATENT DOCUMENTS

CN       2585521 Y     11/2003
CN       2792061 Y      6/2006
(Continued)

OTHER PUBLICATIONS

Ahn, Jeong Hwan, International Search Report and Written Opinion of the International Searching Authority for PCT/US2018/025285, dated Jul. 31, 2018, International Application Division, Korean Intellectual Property Office, Republic of Korea, 14 pages.
(Continued)

*Primary Examiner* — Tai T Nguyen
(74) *Attorney, Agent, or Firm* — Lee & Hayes, P.C.

(57) ABSTRACT

Systems and methods for communicating in a network using parcel theft share signals in accordance with various embodiments of the present disclosure are provided. In one embodiment, an audio/video (A/V) recording and communication device comprises: a camera configured to capture first image data of a drop-off zone; a communication module; and a processing module comprising: a processor; and a parcel theft deterrence application that configures the processor to: monitor a parcel in the drop-off zone, wherein the parcel is associated with parcel tracking data; determine that the parcel has been removed from the drop-off zone; generate a parcel theft share signal using the first image data and the parcel tracking data, wherein the parcel theft share signal includes a command to share the first image data with a network of users; and transmit the parcel theft share signal to the backend server using the communication module.

20 Claims, 23 Drawing Sheets

Related U.S. Application Data continuation of application No. 15/640,446, filed on Jun. 30, 2017, now Pat. No. 9,965,934, which is a continuation-in-part of application No. 15/480,214, filed on Apr. 5, 2017, which is a continuation-in-part of application No. 15/431,607, filed on Feb. 13, 2017, now Pat. No. 10,033,780, said application No. 15/480,214 is a continuation-in-part of application No. 15/431,275, filed on Feb. 13, 2017, now Pat. No. 9,819,713.

(60) Provisional application No. 62/376,826, filed on Aug. 18, 2016, provisional application No. 62/300,547, filed on Feb. 26, 2016, provisional application No. 62/397,626, filed on Sep. 21, 2016, provisional application No. 62/413,252, filed on Oct. 26, 2016.

(51) Int. Cl.
| | | |
|---|---|---|
| *G08B 13/24* | (2006.01) | |
| *E05B 73/00* | (2006.01) | |
| *G08B 25/00* | (2006.01) | |
| *G06K 9/00* | (2006.01) | |
| *G06K 9/20* | (2006.01) | |
| *H04N 5/77* | (2006.01) | |
| *H04N 5/91* | (2006.01) | |
| *H04N 7/18* | (2006.01) | |
| *G08B 3/10* | (2006.01) | |
| *G10L 25/57* | (2013.01) | |
| *G08B 27/00* | (2006.01) | |

(52) U.S. Cl.
CPC ....... *G06K 9/00771* (2013.01); *G06K 9/2018* (2013.01); *G08B 3/10* (2013.01); *G08B 13/19619* (2013.01); *G08B 13/19671* (2013.01); *G08B 13/19682* (2013.01); *G08B 13/19684* (2013.01); *G08B 13/19695* (2013.01); *G08B 13/2417* (2013.01); *G08B 25/00* (2013.01); *G10L 25/57* (2013.01); *H04N 5/77* (2013.01); *H04N 5/91* (2013.01); *H04N 7/186* (2013.01); *G08B 13/19656* (2013.01); *G08B 13/19667* (2013.01); *G08B 27/003* (2013.01)

(58) Field of Classification Search
USPC ........... 340/572.1, 572.7, 568.1, 686.1, 5.54, 340/5.61, 10.1, 540, 541
See application file for complete search history.

(56) References Cited

U.S. PATENT DOCUMENTS

| | | | |
|---|---|---|---|
| 5,760,848 | A | 6/1998 | Cho |
| 5,886,739 | A | 3/1999 | Winningstad |
| 6,072,402 | A | 6/2000 | Kniffin et al. |
| 6,192,257 | B1 | 2/2001 | Ray |
| 6,271,752 | B1 | 8/2001 | Vaios |
| 6,356,196 | B1* | 3/2002 | Wong ................ G08B 13/1427 340/539.1 |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,618,727 | B1 | 9/2003 | Wheeler et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,917,952 | B1 | 7/2005 | Dailey et al. |
| 6,970,183 | B1 | 11/2005 | Monroe |
| 6,975,346 | B2 | 12/2005 | Kumhyr |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,483,485 | B2 | 1/2009 | Winningstad et al. |
| 7,496,140 | B2 | 2/2009 | Winningstad et al. |
| 7,643,056 | B2 | 1/2010 | Silsby |
| 7,669,771 | B2 | 3/2010 | Puttaswamy |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 7,787,697 | B2 | 8/2010 | Ritzau et al. |
| 7,820,900 | B2 | 10/2010 | Lemons |
| 7,834,904 | B2 | 11/2010 | Brookins |
| 7,894,519 | B2 | 2/2011 | Winningstad et al. |
| 8,077,029 | B1 | 12/2011 | Daniel et al. |
| 8,086,461 | B2 | 12/2011 | De Los Reyes et al. |
| 8,121,839 | B2 | 2/2012 | Srivastava et al. |
| 8,139,098 | B2 | 3/2012 | Carter |
| 8,144,183 | B2 | 3/2012 | Carter |
| 8,154,581 | B2 | 4/2012 | Carter |
| 8,457,366 | B2 | 6/2013 | Cheswick |
| 8,520,072 | B1 | 8/2013 | Slavin et al. |
| 8,619,136 | B2 | 12/2013 | Howarter et al. |
| 8,630,820 | B2 | 1/2014 | Amis |
| 8,780,201 | B1 | 7/2014 | Scalisi et al. |
| 8,823,795 | B1 | 9/2014 | Scalisi et al. |
| 8,824,750 | B2 | 9/2014 | Jankowski et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,937,661 | B1 | 1/2015 | Slavin et al. |
| 8,941,736 | B1 | 1/2015 | Scalisi |
| 8,947,530 | B1 | 2/2015 | Scalisi |
| 8,948,465 | B2 | 2/2015 | Tiwari et al. |
| 8,953,040 | B1 | 2/2015 | Scalisi et al. |
| 8,983,941 | B1 | 3/2015 | Murphy-Chutorian et al. |
| 8,998,084 | B2 | 4/2015 | McIntyre |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,055,202 | B1 | 6/2015 | Scalisi et al. |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Kasmir et al. |
| 9,094,584 | B2 | 7/2015 | Scalisi et al. |
| 9,109,378 | B2 | 8/2015 | Scalisi |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,204,103 | B1 | 12/2015 | Zhang et al. |
| 9,230,424 | B1 | 1/2016 | Scalisi et al. |
| 9,237,318 | B2 | 1/2016 | Kasmir et al. |
| 9,240,214 | B2 | 1/2016 | Hannuksela |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,389,083 | B1 | 7/2016 | Agulnik et al. |
| 9,449,229 | B1 | 9/2016 | Laska et al. |
| 9,489,745 | B1 | 11/2016 | Heitz, III et al. |
| 9,494,936 | B2 | 11/2016 | Kerzner |
| 9,508,239 | B1* | 11/2016 | Harrison ............ G08B 13/2462 |
| 9,572,503 | B2 | 2/2017 | DeForest |
| 9,619,955 | B2 | 4/2017 | Eichenblatt |
| 9,721,166 | B2 | 8/2017 | Deri et al. |

(56) References Cited

U.S. PATENT DOCUMENTS

| | | |
|---|---|---|
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,779,316 B2 | 10/2017 | Rao et al. |
| 9,786,133 B2 | 10/2017 | Harrison et al. |
| 9,799,183 B2 | 10/2017 | Harrison et al. |
| 9,854,211 B2 | 12/2017 | Yamaguchi et al. |
| 9,860,282 B2 | 1/2018 | Farrell |
| 9,946,919 B2 | 4/2018 | Weiner et al. |
| 10,008,099 B2 | 6/2018 | Drolshagen et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2003/0053659 A1 | 3/2003 | Pavlidis et al. |
| 2003/0058084 A1 | 3/2003 | O'Hara |
| 2003/0130771 A1 | 7/2003 | Crank |
| 2004/0003073 A1 | 1/2004 | Krzyzanowski et al. |
| 2004/0081020 A1 | 4/2004 | Blosser et al. |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0021724 A1 | 1/2005 | Kung et al. |
| 2005/0111660 A1 | 5/2005 | Hosoda |
| 2005/0132414 A1 | 6/2005 | Bentley et al. |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0170956 A1 | 8/2006 | Jung et al. |
| 2006/0221190 A1 | 10/2006 | Limberis et al. |
| 2007/0008081 A1 | 1/2007 | Tylicki et al. |
| 2007/0091177 A1 | 4/2007 | West et al. |
| 2007/0217780 A1 | 9/2007 | Hirooka et al. |
| 2008/0041942 A1 | 2/2008 | Aissa |
| 2008/0084473 A1 | 4/2008 | Romanowich |
| 2008/0115174 A1 | 5/2008 | Nicholl et al. |
| 2008/0163355 A1 | 7/2008 | Chu |
| 2008/0288299 A1 | 11/2008 | Schultz |
| 2009/0300608 A1 | 12/2009 | Ferris et al. |
| 2009/0326942 A1 | 12/2009 | Fulop |
| 2010/0146055 A1 | 6/2010 | Hannuksela |
| 2010/0225455 A1 | 9/2010 | Claiborne et al. |
| 2010/0309225 A1 | 12/2010 | Gray et al. |
| 2011/0004474 A1 | 1/2011 | Bansal et al. |
| 2011/0058034 A1 | 3/2011 | Grass |
| 2011/0302420 A1 | 12/2011 | Davida |
| 2012/0044050 A1 | 2/2012 | Vig et al. |
| 2012/0243730 A1 | 9/2012 | Outtagarts et al. |
| 2012/0257061 A1 | 10/2012 | Edwards et al. |
| 2013/0057695 A1 | 3/2013 | Huisking |
| 2013/0212521 A1 | 8/2013 | Fedoseyeva et al. |
| 2013/0346563 A1 | 12/2013 | Huang |
| 2014/0070922 A1 | 3/2014 | Davis |
| 2014/0098227 A1 | 4/2014 | Chen et al. |
| 2014/0132772 A1 | 5/2014 | Billau et al. |
| 2014/0143334 A1 | 5/2014 | Jung |
| 2014/0155171 A1 | 6/2014 | Laakkonen et al. |
| 2014/0232737 A1 | 8/2014 | Zhang et al. |
| 2014/0267716 A1 | 9/2014 | Child et al. |
| 2014/0267775 A1 | 9/2014 | Lablans |
| 2014/0282877 A1 | 9/2014 | Mahaffey et al. |
| 2014/0304178 A1 | 10/2014 | Bengson et al. |
| 2014/0328570 A1 | 11/2014 | Cheng et al. |
| 2014/0329507 A1 | 11/2014 | Siminoff |
| 2014/0330890 A1 | 11/2014 | Hourani et al. |
| 2014/0365568 A1 | 12/2014 | Huang et al. |
| 2014/0368601 A1 | 12/2014 | deCharms |
| 2015/0016665 A1 | 1/2015 | Tanner |
| 2015/0022618 A1 | 1/2015 | Siminoff |
| 2015/0035987 A1 | 2/2015 | Fernandez |
| 2015/0058016 A1 | 2/2015 | Goldstein |
| 2015/0095352 A1 | 4/2015 | Lacey |
| 2015/0109111 A1 | 4/2015 | Lee et al. |
| 2015/0109128 A1 | 4/2015 | Fadell et al. |
| 2015/0120598 A1 | 4/2015 | Fadell et al. |
| 2015/0154462 A1 | 6/2015 | Rosenkrantz |
| 2015/0163463 A1 | 6/2015 | Hwang et al. |
| 2015/0189041 A1 | 7/2015 | Wang et al. |
| 2015/0189243 A1 | 7/2015 | Cucco |
| 2015/0208103 A1 | 7/2015 | Guntur et al. |
| 2015/0281321 A1 | 10/2015 | Hrytsevich et al. |
| 2015/0293996 A1 | 10/2015 | Liu |
| 2015/0319590 A1 | 11/2015 | Sharon et al. |
| 2015/0339912 A1 | 11/2015 | Farrand et al. |
| 2015/0341603 A1 | 11/2015 | Kasmir et al. |
| 2015/0363638 A1 | 12/2015 | Takahashi |
| 2015/0363989 A1 | 12/2015 | Scalisi |
| 2015/0365632 A1 | 12/2015 | Eilertsen |
| 2015/0365707 A1 | 12/2015 | Melanson |
| 2016/0050037 A1 | 2/2016 | Webb |
| 2016/0092727 A1 | 3/2016 | Ren et al. |
| 2016/0094810 A1 | 3/2016 | Mirza et al. |
| 2016/0105644 A1 | 4/2016 | Smith et al. |
| 2016/0180667 A1* | 6/2016 | Bunker ............ G08B 13/19613 382/103 |
| 2016/0182850 A1 | 6/2016 | Thompson |
| 2016/0192166 A1 | 6/2016 | deCharms |
| 2016/0203370 A1 | 7/2016 | Child et al. |
| 2016/0224841 A1 | 8/2016 | Rosenkrantz et al. |
| 2016/0248840 A1 | 8/2016 | Bockhold et al. |
| 2016/0260459 A1 | 9/2016 | Miner |
| 2016/0343220 A1* | 11/2016 | Grabham ............ G08B 13/1472 |
| 2016/0345035 A1 | 11/2016 | Han et al. |
| 2016/0351030 A1 | 12/2016 | Williams |
| 2016/0366373 A1 | 12/2016 | Siminoff et al. |
| 2017/0127012 A1 | 5/2017 | Marchya et al. |
| 2017/0161383 A1 | 6/2017 | Caudle et al. |
| 2017/0214781 A1 | 7/2017 | Ichida et al. |
| 2017/0236193 A1 | 8/2017 | Zundel et al. |
| 2017/0262798 A1 | 9/2017 | Kosseifi et al. |
| 2017/0270930 A1 | 9/2017 | Ozmeral et al. |
| 2017/0293883 A1 | 10/2017 | Li et al. |
| 2018/0012460 A1 | 1/2018 | Heitz, III et al. |
| 2018/0033153 A1 | 2/2018 | Hirasawa et al. |
| 2018/0220108 A1 | 8/2018 | Siminoff et al. |
| 2018/0232895 A1 | 8/2018 | Modestine et al. |
| 2018/0233010 A1 | 8/2018 | Modestine et al. |
| 2018/0233025 A1 | 8/2018 | Modestine et al. |
| 2018/0356961 A1 | 12/2018 | Lewis et al. |
| 2019/0051143 A9 | 2/2019 | Modestine et al. |
| 2019/0342527 A1 | 11/2019 | Siminoff |
| 2019/0378284 A1 | 12/2019 | Siminoff et al. |
| 2020/0042555 A1 | 2/2020 | Duda et al. |
| 2020/0043185 A1 | 2/2020 | Siminoff et al. |

FOREIGN PATENT DOCUMENTS

| | | |
|---|---|---|
| CN | 104318654 | 1/2015 |
| EP | 0944883 | 6/1998 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| IN | 2015CH00695 | 4/2015 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004054536 | 2/2004 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| JP | 2011134003 | 7/2011 |
| JP | 2013065187 | 4/2013 |
| KR | 10-1658006 | 9/2016 |

(56) References Cited

FOREIGN PATENT DOCUMENTS

| | | |
|---|---|---|
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |
| WO | WO2015155725 | 10/2015 |
| WO | WO2016109838 | 7/2016 |
| WO | WO2016114932 | 7/2016 |

OTHER PUBLICATIONS

Anonymous, "Creating a network share for video surveillance storage" Jan. 12, 2012, cctvcamerapros, 12 pages.

BusinessWire—FaceFirst Makes Shopping Safer with National Facial Recognition Deployment—2014, 2 pages.

The Canadian Office Action dated Nov. 25, 2019 for Canadian Patent Application No. 3,015,480, a counterpart of U.S. Pat. No. 9,819,713, 3 pages.

Chacos—7 Casino Technologies They Dont Want You to Know About—Gizmodo—2011, 4 pages.

Cohen—6 Ways Law Enforcement Uses Social Media to Fight Crime—2010, 9 pages.

FindBiometrics—Interview_Joe Rosenkrantz_CEO_FaceFirst—2015, 13 pages.

Hess—Facial Recognition _A Valuable Tool for Law Enforcement—2010, 6 pages.

The Japanese Office Action dated Jan. 20, 2020 for Japanese Patent Application No. 2019-0054022, a counterpart foreign application of the U.S. Pat. No. 9,819,713, 4 pages.

WhatsApp, "WhatsApp Share Button", WordPress.org, https://web.archive.org/web/20141120072621/https://wordpress.org/plugins/whatsapp/, Nov. 20, 2014, 3 pages.

Office Action for U.S. Appl. No. 16/595,312, dated Jan. 22, 2020, Duda, "Searching Shared Video Footage From Audio/Video Recording and Communication Devices", 12 Pages.

Office Action for U.S. Appl. No. 15/721,549, dated Jan. 28, 2020, Siminoff, "Verification and Membership to Neighborhoods for Sharing of Video Footage from Audio/Video Recording and Communication Devices", 19 Pages.

Office Action for U.S. Appl. No. 15/904,403, dated Feb. 18, 2020, Modestine, "Neighborhood Alert Mode for Triggering Multi-Device Recording, Multi-Camera Locating, and Multi-Camera Event Stitching for Audio/Video Recording and Communication Devices", 16 Pages.

Final Office Action dated Sep. 24, 2019 for U.S. Appl. No. 15/904,398 "Neighborhood Alert Mode for Triggering Multi-Device Recording, Multi-Camera Locating, and Multi-Camera Event Stitching for Audio/Video Recording and Communication Devices" Modestine, 12 pages.

Final Office Action dated Oct. 17, 2019 for U.S. Appl. No. 15/904,403 "Neighborhood Alert Mode for Triggering Multi-Device Recording, Multi-Camera Locating, and Multi-Camera Event Stitching for Audio/Video Recording and Communication Devices" Modestine, 15 pages.

Office Action for U.S. Appl. No. 15/857,537, dated Oct. 23, 2019, Siminoff, "Locating a Person of Interest Using Shared Video Footage from Audio/Video Recording and Communication Devices", 22 pages.

Office Action for U.S. Appl. No. 15/480,214, dated Nov. 26, 2019, Siminoff, Triggering Actions Based on Shared Video Footage from Audio/Video Recording and Communication Devices, 20 Pages.

Office action for U.S. Appl. No. 16/551,469, dated Dec. 2, 2019, Siminoff, "Sharing Video Footage from Audio/Video Recording and Communication Devices", 12 pages.

Non Final Office Action dated Dec. 26, 2019 for U.S. Appl. No. 15/926,496 "Augmenting and Sharing Data From Audio/Video Recording and Communication Devices" Siminoff, 19 pages.

Office Action for U.S. Appl. No. 15/925,637, dated Dec. 4, 2019, Siminoff, "Sharing Positive Information Captured Using Audio/Video Recording and Communication", 26 Pages.

Office Action for U.S. Appl. No. 15/904,403, dated Apr. 16, 2019, Modestine, "Neighborhood Alert Mode for Triggering Multi-Device Recording, Multi-Camera Motion Tracking, and Multi-Camera Event Stitching for Audio/Video Recording and Communication Devices", 10 pages.

Office Action for U.S. Appl. No. 15/904,398, dated Apr. 18, 2019, Modestine, "Neighborhood Alert Mode for Triggering Multi-Device Recording, Multi-Camera, Motion Tracking, and Multi-Camera Event Stitching for Audio/Video Recording and Communication Devices", 11 pages.

The PCT Search Report and Written Opinion dated Jul. 31, 2018 for PCT application No. PCT/US2018/026054, 16 pages.

Roberts—Walmart used facial recognition technology to catch shoplifters—Fortune—2015, 9 pages.

US Dept of Justice—NDEx policy and operating manual—Jan. 26, 2016, 21 pages.

\* cited by examiner

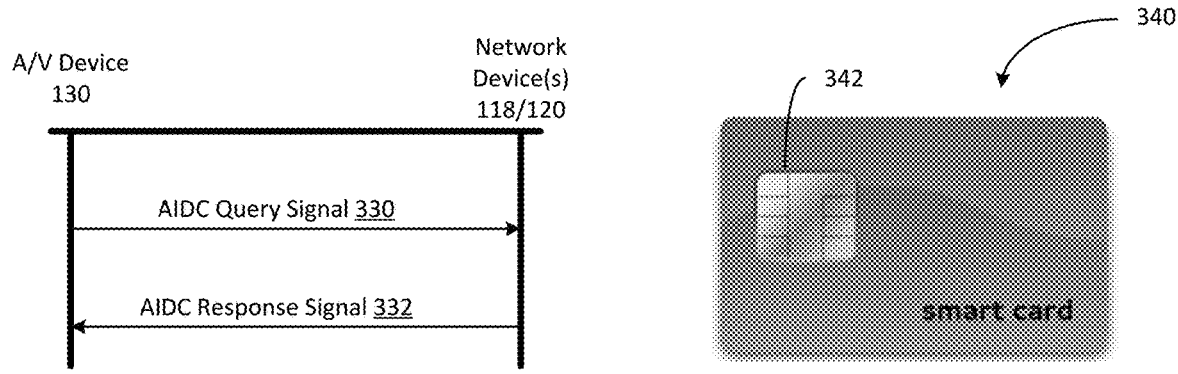
FIG. 20
FIG. 21
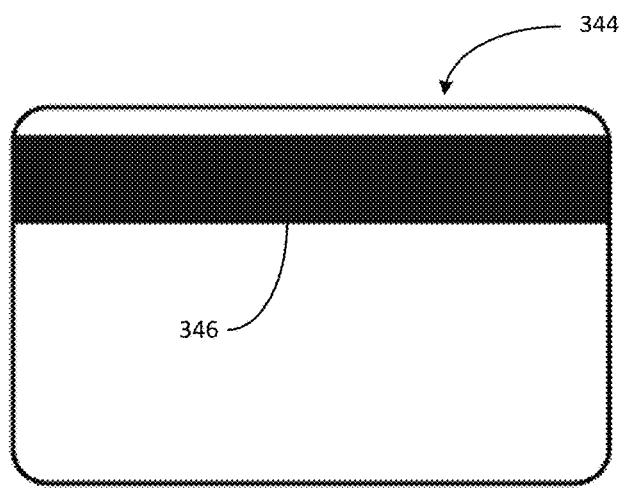
FIG. 22
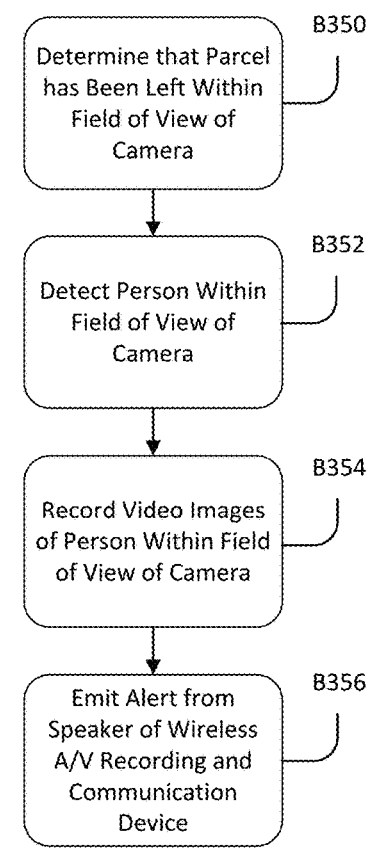
FIG. 23

SHARING VIDEO FOOTAGE FROM AUDIO/VIDEO RECORDING AND COMMUNICATION DEVICES FOR PARCEL THEFT DETERRENCE

CROSS-REFERENCE TO RELATED APPLICATIONS

This application is a continuation of U.S. application Ser. No. 15/948,772, filed on Apr. 9, 2018, which is a continuation of U.S. application Ser. No. 15/640,446, filed on Jun. 20, 2017, now U.S. Pat. No. 9,965,934, which is a continuation-in-part of U.S. application Ser. No. 15/480,214, filed on Apr. 5, 2017, which is a continuation-in-part of U.S. application Ser. No. 15/431,607, filed on Feb. 13, 2017, now U.S. Pat. No. 10,033,780, and U.S. application Ser. No. 15/431,275, filed on Feb. 13, 2017, now U.S. Pat. No. 9,819,713, each of which claims priority to provisional application Ser. No. 62/376,826, filed on Aug. 18, 2016, and provisional application Ser. No. 62/300,547, filed on Feb. 26, 2016. The U.S. application Ser. No. 15/640,446 also claims priority to provisional application Ser. No. 62/397,626, filed on Sep. 21, 2016, and provisional application Ser. No. 62/413,252, filed on Oct. 26, 2016. The entire contents of the priority applications are hereby incorporated by reference as if fully set forth.

TECHNICAL FIELD

The present embodiments relate to audio/video (AN) recording and communication devices, including A/V recording and communication doorbell systems. In particular, the present embodiments relate to improvements in the functionality of A/V recording and communication devices that strengthen the ability of such devices to deter and prevent parcel theft.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present sharing video footage from audio/video (A/V) recording and communication devices for parcel theft deterrence now will be discussed in detail with an emphasis on highlighting the advantageous features. These embodiments depict the novel and non-obvious sharing video footage from A/V recording and communication devices for parcel theft deterrence shown in the accompanying drawings, which are for illustrative purposes only. These drawings include the following figures, in which like numerals indicate like parts:

FIG. 20 is a sequence diagram illustrating an embodiment of a process for deterring parcel theft with an A/V recording and communication device according to various aspects of the present disclosure;

FIG. 21 is a front elevation view of a smart card;

FIG. 22 is a rear elevation view of a magnetic stripe card;

FIG. 23 is a flowchart illustrating an embodiment of a process for deterring parcel theft with an A/V recording and communication device according to various aspects of the present disclosure;

DETAILED DESCRIPTION

Figure 1:
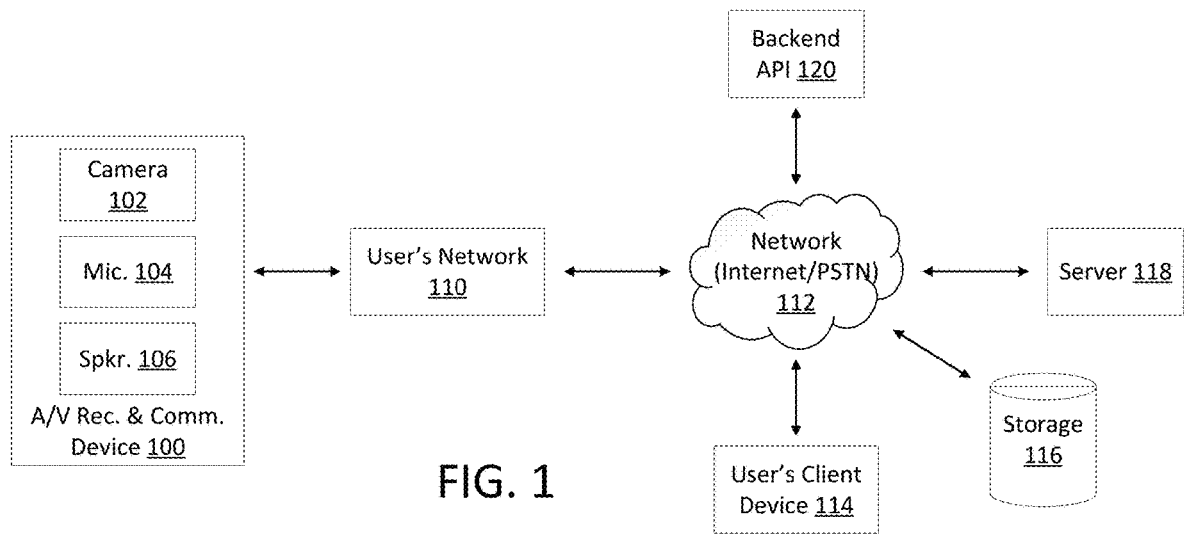
FIG. 1 is a functional block diagram illustrating a system for streaming and storing A/V content captured by an audio/video (A/V) recording and communication device according to various aspects of the present disclosure.

The various embodiments of the present sharing video footage from audio/video (A/V) recording and communication devices for parcel theft deterrence have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that parcel pilferage is a pernicious and persistent problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves.

Another aspect of the present embodiments includes the realization that users of A/V recording and communication devices may share video footage recorded by their devices to deter parcel theft. For example, an A/V recording and communication device may be configured to monitor a drop-off zone, determine when a parcel theft has occurred, and generate a parcel theft share signal to alert his or her neighbors of the parcel theft. In some embodiments, the A/V recording and communication device may transmit the parcel theft share signal as soon as the A/V recording and communication device recognizes that a parcel theft has occurred. Further, the parcel theft share signal may include image data captured of the drop-off zone that may include image data of the parcel and/or the thief in the act. Moreover, the parcel theft share signal may also include parcel tracking data such as (but not limited to) automatic identification and data capture (AIDC) data, geographical location data, a time-stamp, or any other data that may be used to track the parcel and/or to identify and apprehend the parcel thief or thieves. In another example, the parcel theft share signal may be transmitted to a backend server, where the backend server may generate a parcel theft alert that includes data from the parcel theft share signal such as (but not limited to) image data and/or parcel tracking data. In many embodiments, the backend server may further transmit the parcel theft alert to various client devices associated with various users within the network of users and/or law enforcement agencies. The present embodiments provide these and other advantages and enhancements, as described below.

The following detailed description describes the present embodiments with reference to the drawings. In the drawings, reference numbers label elements of the present embodiments. These reference numbers are reproduced below in connection with the discussion of the corresponding drawing features.

The embodiments of the present sharing video footage from audio/video (A/V) recording and communication devices for parcel theft deterrence are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image-display resolution of 1080p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the home network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the home network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's home network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
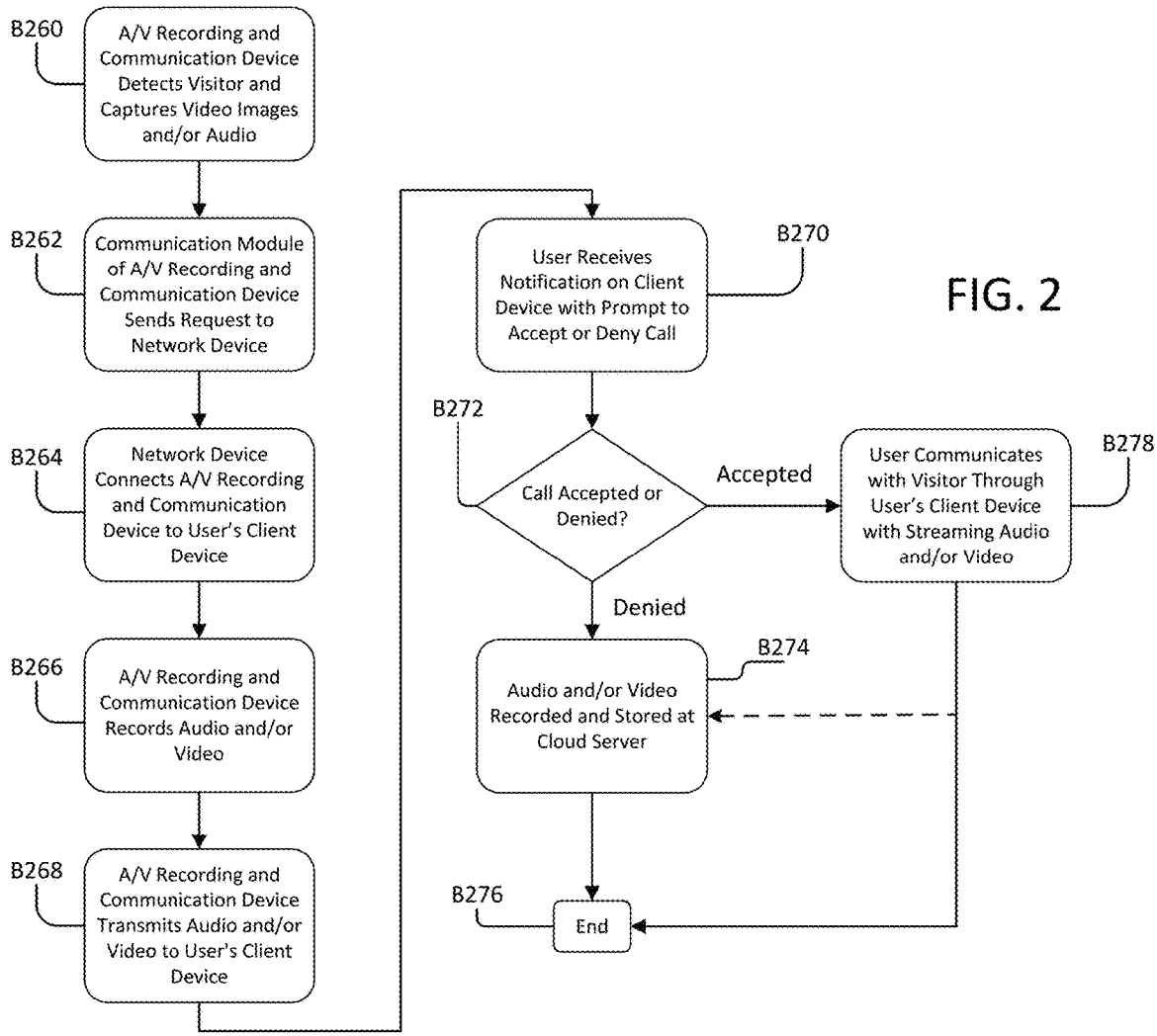
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B260, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B262, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B264 the network device may connect the A/V recording and communication device 100 to the user's client device 114 through the user's network 110 and the network 112. At block B266, the A/V recording and communication device 100 may record available audio and/or video data using the camera 102, the microphone 104, and/or any other device/sensor available. At block B268, the audio and/or video data is transmitted (streamed) from the A/V recording and communication device 100 to the user's client device 114 via the user's network 110 and the network 112. At block B270, the user may receive a notification on his or her client device 114 with a prompt to either accept or deny the call.

At block B272, the process determines whether the user has accepted or denied the call. If the user denies the notification, then the process advances to block B274, where the audio and/or video data is recorded and stored at a cloud server. The session then ends at block B276 and the connection between the A/V recording and communication device 100 and the user's client device 114 is terminated. If, however, the user accepts the notification, then at block B278 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B276. In some embodiments, the audio and/or video data may be recorded and stored at a cloud server (block B274) even if the user accepts the notification and communicates with the visitor through the user's client device 114.

Figure 3:
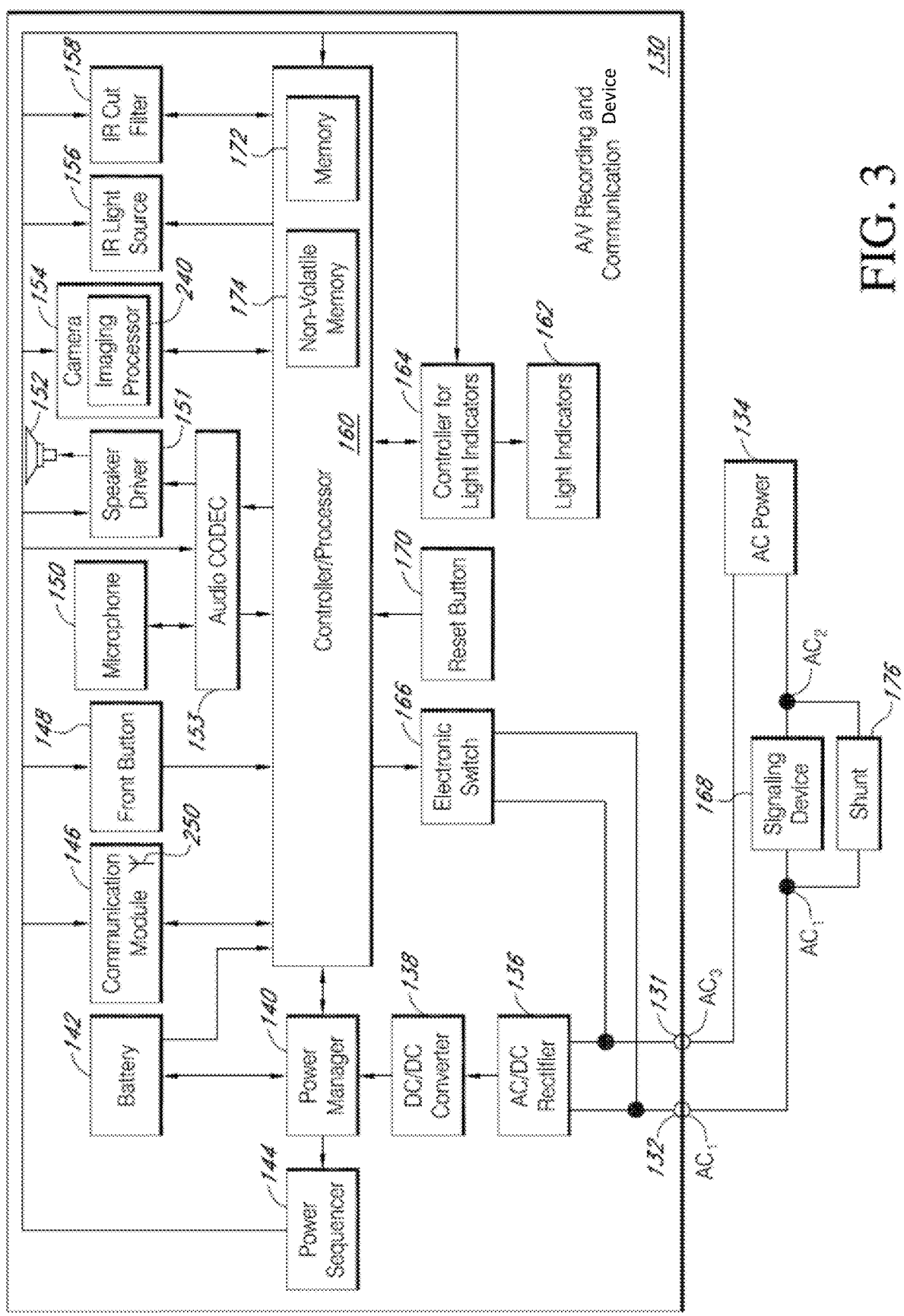
FIG. 3 is a functional block diagram illustrating an embodiment of an A/V recording and communication device according to the present disclosure.

FIGS. 3-13 illustrate one embodiment of a low-power-consumption A/V recording and communication device 130 according to various aspects of the present disclosure. FIG. 3 is a functional block diagram illustrating various components of the wireless A/V recording and communication device 130 and their relationships to one another. For example, the wireless A/V recording and communication device 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the wireless A/V recording and communication device 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the wireless A/V recording and communication device 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the wireless A/V recording and communication device 130 further comprises an electronic switch 166 that closes when the front button 148 is depressed. When the electronic switch 166 closes, power from the AC power source 134 is diverted through a signaling device 168 that is external to the wireless A/V recording and communication device 130 to cause the signaling device 168 to emit a sound, as further described below. In one non-limiting example, the electronic switch 166 may be a triac device. The wireless A/V recording and communication device 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication device 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's wireless network 110, routed by the server 118 and delivered to the user's client device 114. When the user speaks, after being transferred through the network 112, the user's wireless network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the wireless A/V recording and communication device 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the wireless A/V recording and communication device 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the wireless A/V recording and communication device 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the device 130 therefore causes the signaling device 168 to "ring," alerting any person(s) within the structure to which the device 130 is mounted that there is a visitor at the front door (or at another location corresponding to the location of the device 130). In one non-limiting example, the electronic switch 166 may be a triac device.

Figure 4:
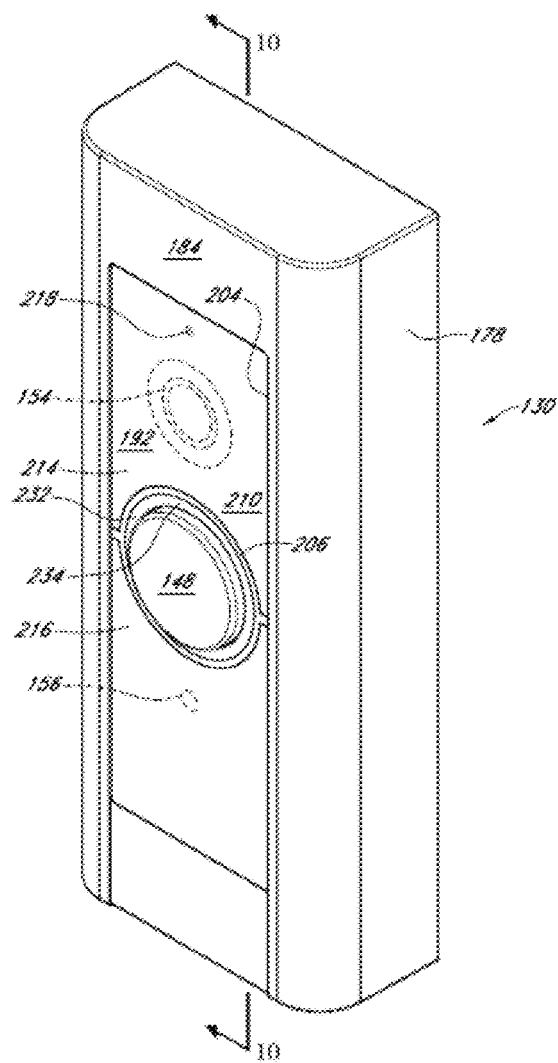
FIG. 4 is a front perspective view of an embodiment of an A/V recording and communication device according to the present disclosure.
Figure 5:
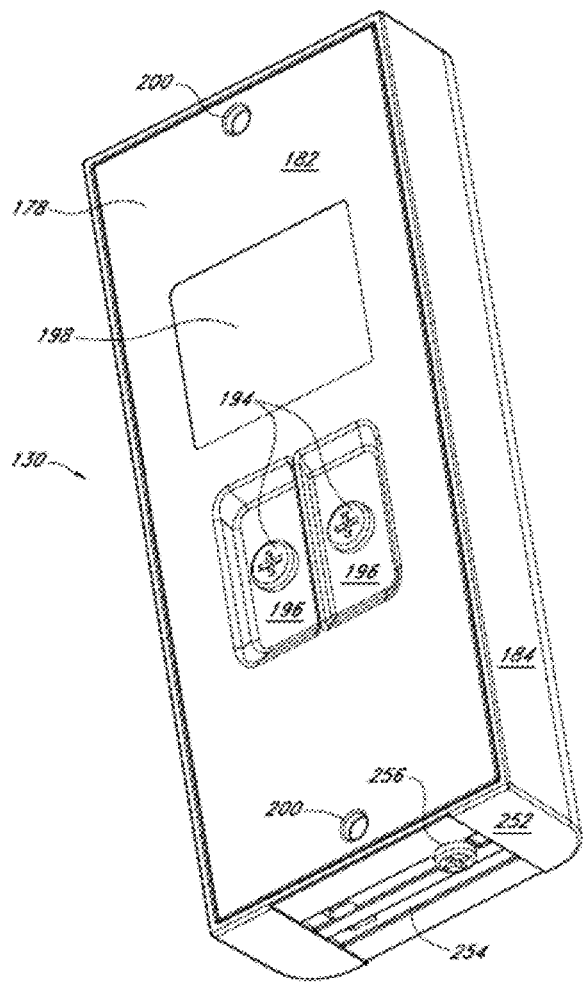
FIG. 5 is a rear perspective view of the A/V recording and communication device of FIG. 4.
Figure 6:
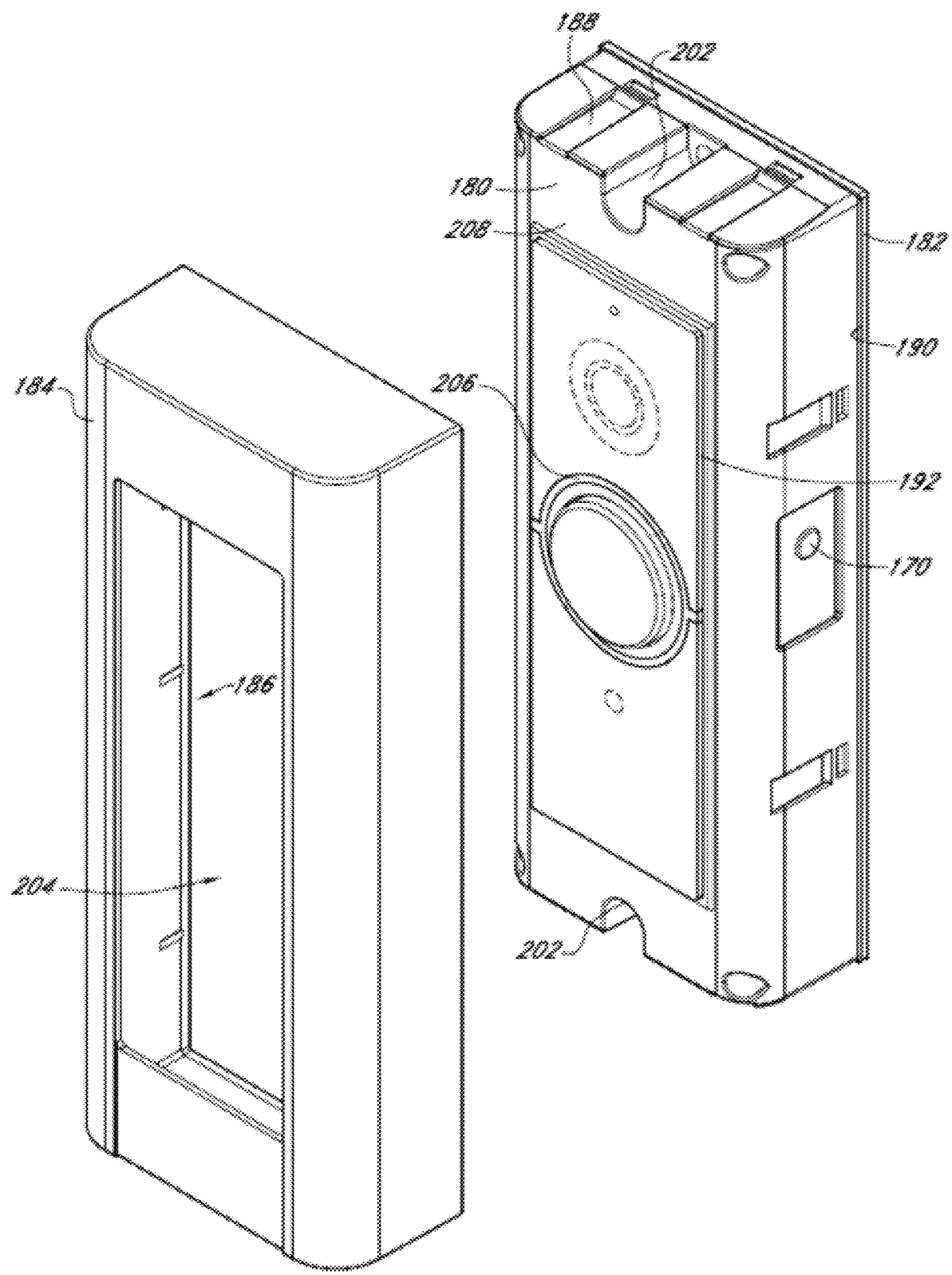
FIG. 6 is a partially exploded front perspective view of the A/V recording and communication device of FIG. 4 showing the cover removed.

With reference to FIGS. 4-6, the wireless A/V recording and communication device 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication device 130. For example, the wireless A/V recording and communication device 130 may be packaged and sold with multiple shells 184 in different colors in the same package.

With reference to FIG. 4, a front surface of the wireless A/V recording and communication device 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the wireless A/V recording and communication device 130). With further reference to FIG. 4, the wireless A/V recording and communication device 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the wireless A/V recording and communication device 130. The terminal screws 194 are configured to receive electrical wires to connect to the wireless A/V recording and communication device 130, through the terminals 131, 132, to the household AC power supply 134 of the structure on which the wireless A/V recording and communication device 130 is mounted. In the illustrated embodiment, the terminal screws 194 are located within a recessed portion 196 of the rear surface 198 of the back plate 182 so that the terminal screws 194 do not protrude from the outer envelope of the wireless A/V recording and communication device 130. The wireless A/V recording and communication device 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the wireless A/V recording and communication device 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the wireless A/V recording and communication device 130 may include a mounting plate or bracket (not shown) to facilitate securing the wireless A/V recording and communication device 130 to the mounting surface.

Figure 10:
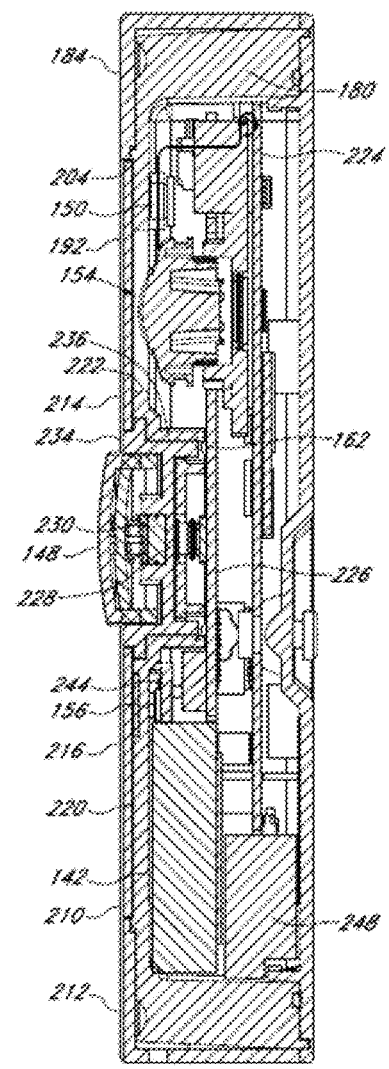
FIG. 10 is a right-side cross-sectional view of the A/V recording and communication device of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the wireless A/V recording and communication device 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
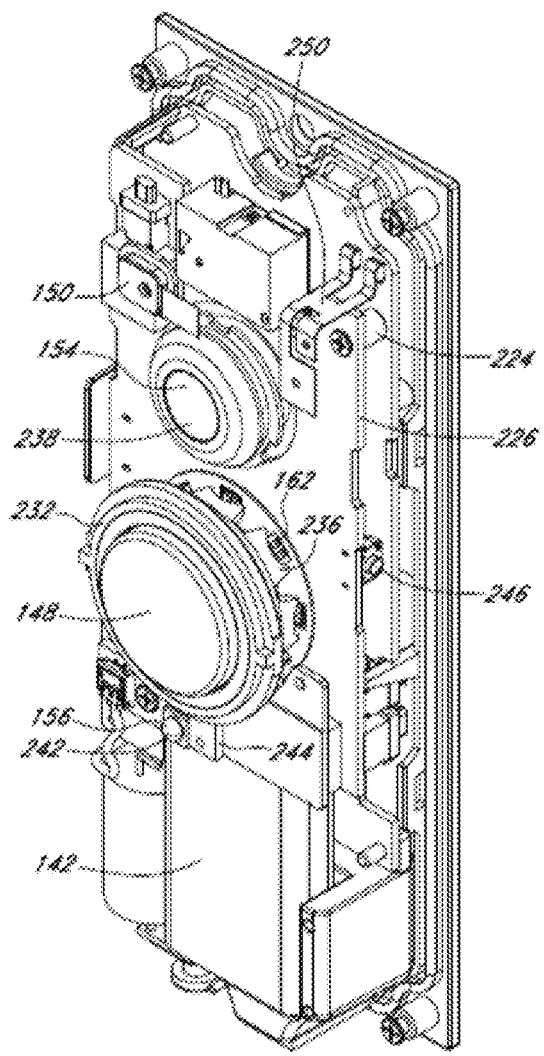
FIGS. 7-9 are front perspective views of various internal components of the A/V recording and communication device of FIG. 4.
Figure 8:
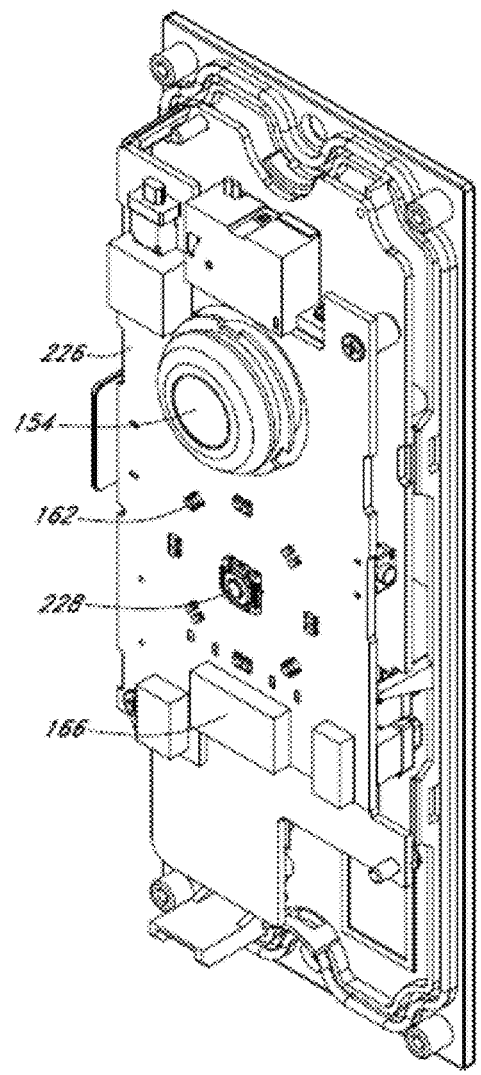
Figure 9:
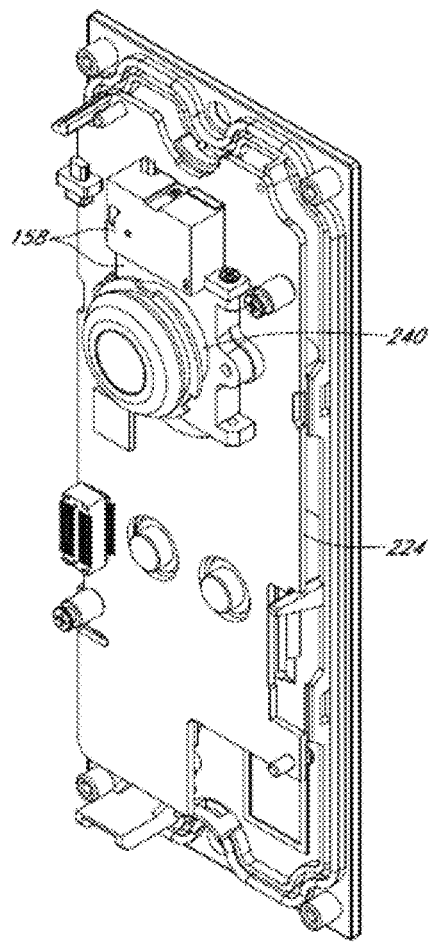

FIGS. 7-10 illustrate various internal components of the wireless A/V recording and communication device 130. FIGS. 7-9 are front perspective views of the device 130 with the shell 184 and the enclosure 180 removed, while FIG. 10 is a right-side cross-sectional view of the device 130 taken through the line 10-10 in FIG. 4. With reference to FIGS. 7 and 8, the wireless A/V recording and communication device 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the device 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the device 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the wireless A/V recording and communication device 130 further comprises a rechargeable battery 142. As described in further detail below, the wireless A/V recording and communication device 130 is connected to an external power source 134 (FIG. 3), such as AC mains. The wireless A/V recording and communication device 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the wireless A/V recording and communication device 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the wireless A/V recording and communication device 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the wireless A/V recording and communication device 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. In alternative embodiments of the IR LED PCB 244, the IR LED PCB 244 may include more than one IR LED 242. For example, the IR LED PCB 244 may include three IR LEDs 242, or any other number of IR LEDs 242. In embodiments including more than one IR LED 242, the size of the third opening in the cover may be increased to accommodate the larger size of the IR LED PCB 244.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the wireless A/V recording and communication device 130 can clearly capture images at night (may be referred to as "night vision").

With reference to FIG. 9, the wireless A/V recording and communication device 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the wireless A/V recording and communication device 130 is powered by a connection to AC mains, and the camera 154, therefore, is always powered on. In other embodiments, however, the wireless A/V recording and communication device 130 may include a light sensor separate from the camera 154 for use in controlling the IR cut filter 158 and the IR LED 242.

With reference back to FIG. 6, the wireless A/V recording and communication device 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160. In some embodiments, the reset button 170 may also be used in a process to activate the wireless A/V recording and communication device 130, as described below.

Figure 11:
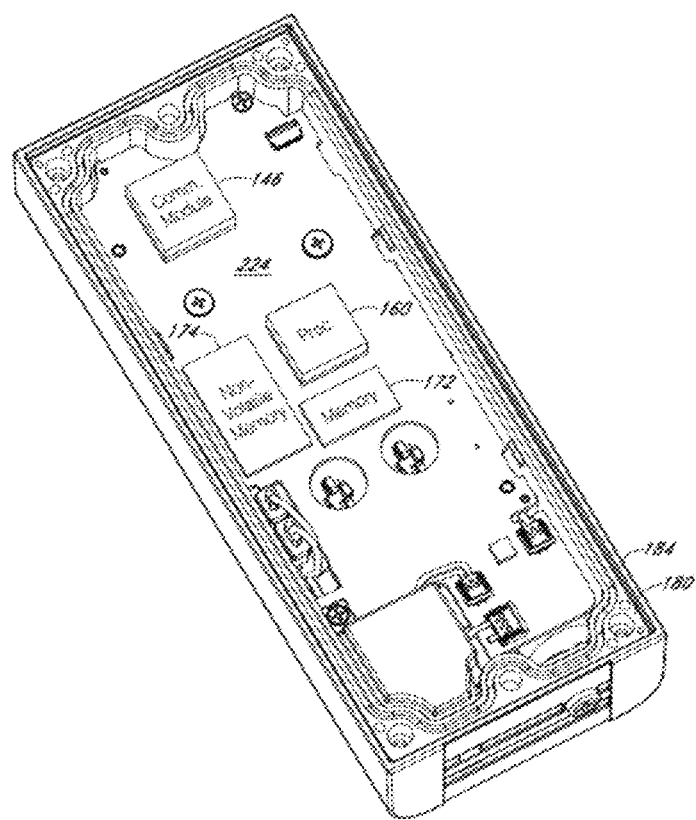
FIGS. 11-13 are rear perspective views of various internal components of the A/V recording and communication device of FIG. 4.
Figure 12:
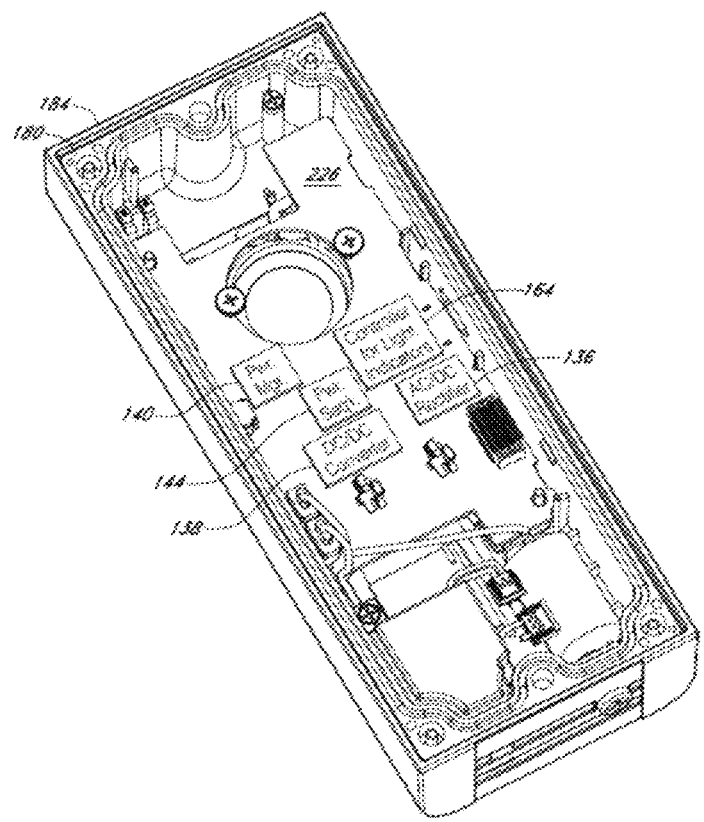
Figure 13:
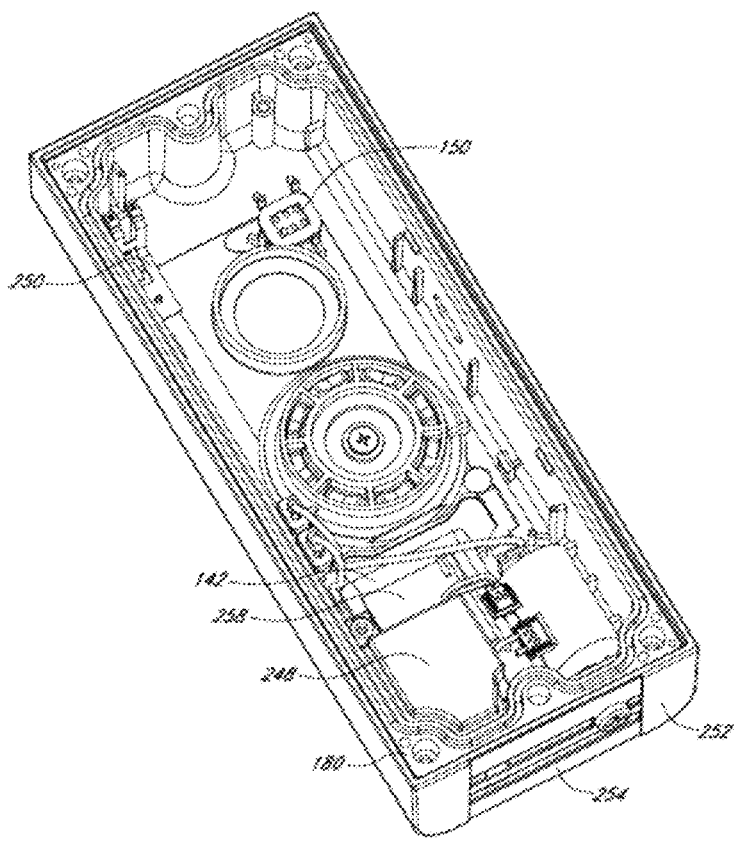

FIGS. 11-13 further illustrate internal components of the wireless A/V recording and communication device 130. FIGS. 11-13 are rear perspective views of the device 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the wireless A/V recording and communication device 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the wireless A/V recording and communication device 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the wireless A/V recording and communication device 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the device 130 is mounted to a mounting bracket (not shown), the security screw may also maintain the device 130 on the mounting bracket.

With reference to FIG. 13, the wireless A/V recording and communication device 130 may further include a battery heater 258. The present A/V recording and communication device 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As discussed above, the present disclosure provides numerous examples of methods and systems including wireless A/V recording and communication doorbells, but the present embodiments are equally applicable for wireless A/V recording and communication devices other than doorbells. For example, the present embodiments may include one or more wireless A/V recording and communication security cameras instead of, or in addition to, one or more A/V recording and communication doorbells. An example wireless A/V recording and communication security camera may include substantially all of the structure and functionality of the device 130, but without the front button 148, the button actuator 228, and/or the light pipe 232.

The present disclosure also provides numerous examples of methods and systems including wireless A/V recording and communication devices that are powered by a connection to AC mains, but the present embodiments are equally applicable for wireless A/V recording and communication devices that are battery powered. For example, the present embodiments may include a wireless A/V recording and communication device such as those described in US Patent Application Publication Nos. 2015/0022620 (application Ser. No. 14/499,828) and 2015/0022618 (application Ser. No. 14/334,922), both of which are incorporated herein by reference in their entireties as if fully set forth.

As discussed above, parcel theft is an increasingly common problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of wireless A/V recording and communication devices could be leveraged to deter parcel theft and/or to identify and apprehend parcel thieves. It would also be advantageous if the functionality of wireless A/V recording and communication devices could be enhanced in one or more ways to deter parcel theft and/or to identify and apprehend parcel thieves. The present embodiments provide these advantages and enhancements, as described below.

For example, some of the present embodiments deter parcel theft and/or facilitate the identification and apprehension of parcel thieves by determining that a parcel has been delivered, determining that the parcel has been removed from the delivery area, determining whether removal of the parcel was authorized, and, when the removal of the parcel is determined to have been unauthorized, generating an alert. Further, because the present embodiments include wireless A/V recording and communication devices, acts of parcel theft are recorded by the camera of the wireless A/V recording and communication device. These images are useful in identifying and apprehending parcel thieves.

Some of the present embodiments comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present AN recording and communication device 130 may include a computer vision module 163. The computer vision module 163 may include any of the components (e.g. hardware) and/or functionality described herein with respect to computer vision, including, without limitation, one or more cameras, sensors, and/or processors. In some embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Figure 14:
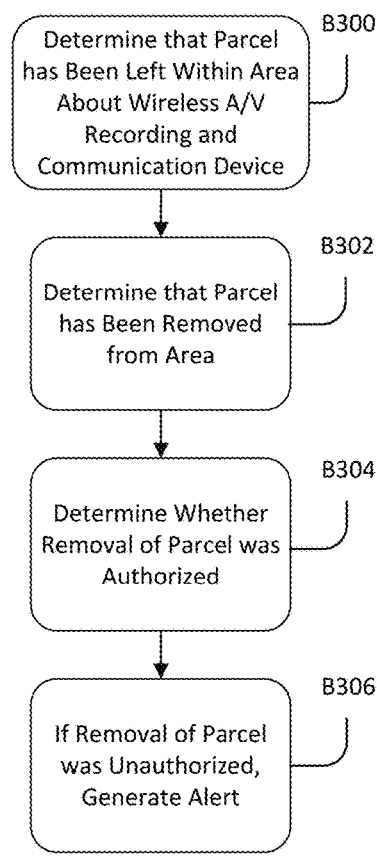
FIG. 14 is a flowchart illustrating an embodiment of a process for deterring parcel theft with an A/V recording and communication device according to various aspects of the present disclosure.

FIG. 14 illustrates an example embodiment of a process for deterring parcel theft with a wireless A/V recording and communication device according to various aspects of the present disclosure. At block B300, the process determines that a parcel has been left within an area about a wireless A/V recording and communication device, such as the wireless A/V recording and communication device 130 described above. The present embodiments encompass any method of determining that a parcel has been left within an area about a wireless A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been left within the area about the wireless A/V recording and communication device 130 may comprise comparing video frames recorded by the camera 154 of the wireless A/V recording and communication device 130, e.g. using computer vision. For example, before a parcel is left within the area about the wireless A/V recording and communication device 130, the field of view of the camera 154 may remain largely static. Different objects may occasionally (or frequently) pass through the camera's field of view, such as people, animals, cars, etc., but these objects generally do not remain within the camera's field of view for very long (on the order of seconds) and, if they stop within the camera's field of view, they typically begin moving again soon after stopping. By contrast, when a parcel is left within the camera's field of view, it typically remains within the camera's field of view for a significant amount of time (on the order of minutes or hours), and the parcel typically remains motionless throughout the time that it remains within the camera's field of view (at least until someone picks it up and carries it away). Thus, comparing video frames from a time before a parcel is left within the camera's field of view with video frames from a time after the parcel is left within the camera's field of view may enable a reliable determination to be made as to whether an object that is present within the camera's field of view is a parcel or not.

The present embodiments contemplate numerous methodologies for determining whether an object that is present within the camera's field of view is a parcel or not. Any or all of these methodologies may include one or more aspects of computer vision. For example, in some embodiments an object within the camera's field of view may be determined to be a parcel if the object is not present within the camera's field of view at a first time (in a first video frame), the object is present within the camera's field of view at a second time after the first time (in a second video frame), and the object remains within the camera's field of view for at least a threshold amount of time. Determining whether the object remains within the camera's field of view for at least the threshold amount of time may comprise review of one or more video frames that are recorded after the second video frame. In other embodiments, an object within the camera's field of view may be determined to be a parcel if the object is not present within the camera's field of view at a first time (in a first video frame), the object is present within the camera's field of view at a second time after the first time (in a second video frame), and the object remains motionless within the camera's field of view for at least a threshold amount of time. Determining whether the object remains motionless within the camera's field of view for at least the threshold amount of time may comprise review of one or more video frames that are recorded after the second video frame.

In other embodiments, an object within the camera's field of view may be determined to be a parcel if the object is not present within the camera's field of view at a first time (in a first video frame), a person is detected approaching the wireless A/V recording and communication device 130 at a second time after the first time (in a second video frame), the person is detected moving away from the wireless A/V recording and communication device 130 at a third time after the second time (in a third video frame), and the object is present within the camera's field of view at a fourth time after the third time (in a fourth video frame).

In other embodiments, an object within the camera's field of view may be determined to be a parcel if the object is not present within the camera's field of view at a first time (in a first video frame), a stationary vehicle (which may be a delivery vehicle, for example) is detected within the camera's field of view at a second time after the first time (in a second video frame), the object is present within the camera's field of view at a third time after the second time (in a third video frame), and the vehicle is no longer present within the camera's field of view at a fourth time after the third time (in a fourth video frame).

In other embodiments, an object within the camera's field of view may be determined to be a parcel if the object is not present within the camera's field of view at a first time (in a first video frame), the object is present within the camera's field of view at a second time after the first time (in a second video frame), and the object meets one or more criteria, such as having one or more physical characteristics. Examples of physical characteristics that may be examined to determine whether the object is a parcel include, without limitation, size, shape, color, and material (or materials). For example, if the object is made of cardboard and is brown or white (common colors for cardboard shipping boxes), it may be determined to be a parcel.

The present embodiments contemplate many processes for examining physical characteristics of the object and making a determination as to whether the object is a parcel. For example, some embodiments may comprise gathering information about the object using computer vision, and then comparing the gathered information about the object to stored information about parcels to determine whether there is a match. For example, the present embodiments may include a database of parcels and/or physical characteristics of parcels. The database may include pictures of known parcels, and comparing the gathered information about the object to the stored information about parcels may comprise comparing a picture of the object to the pictures of known parcels. Gathering information about the object using computer vision may comprise using one or more cameras, scanners, imagers, etc. and/or one or more sensors, such as sonar.

Figure 15:
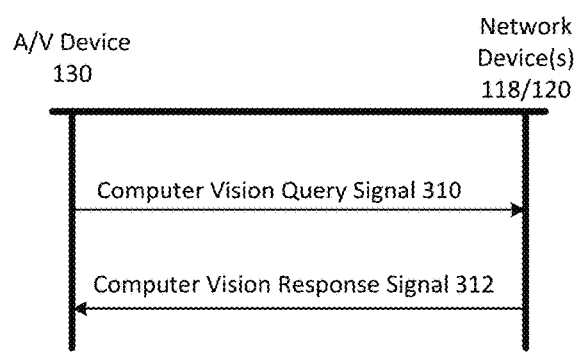
FIG. 15 is a sequence diagram illustrating an embodiment of a process for deterring parcel theft with an A/V recording and communication device according to various aspects of the present disclosure.

With reference to FIG. 15, information received by the computer vision module 163 of the wireless A/V recording and communication device 130 may be sent to one or more network devices, such as the server 118 and/or the backend API 120, in a computer vision query signal 310. The one or more network devices may then analyze the sent information and/or compare the sent information with other information in one or more databases to determine whether there is a match, for example in order to identify the parcel. In one example embodiment, comparing the sent information about the parcel with other information in one or more databases to determine whether there is a match may comprise comparing the sent information, such as one or more photos or images, about the parcel with photos and/or images of known parcels. If there is a match, then one or more actions may occur, such as the wireless A/V recording and communication device 130 transitioning to a different operational mode. For example, the network device, such as the server 118 and/or the backend API 120, may send a computer vision response signal 312 to the wireless A/V recording and communication device 130. The computer vision response signal 312 may include a command to the wireless A/V recording and communication device 130 to change the operational mode of the wireless A/V recording and communication device 130. For example, the command to the wireless A/V recording and communication device 130 may cause the wireless A/V recording and communication device 130 to transition to an "armed" mode in which the wireless A/V recording and communication device 130 is configured to take one or more actions when the parcel is removed from the area about the wireless A/V recording and communication device 130, as described below.

In another example embodiment, determining that the parcel has been left within the area about the wireless A/V recording and communication device 130 may comprise receiving information from a carrier (e.g. the postal service, FedEx, UPS, etc.) that delivered the parcel. For example, when the parcel carrier delivers the parcel, or at some time after the parcel carrier has delivered the parcel, the carrier may update a delivery status of the parcel in the carrier's parcel tracking system to indicate that the parcel has been delivered. The carrier's parcel tracking system may then forward that information to one or more network devices, such as the server 118 and/or the backend API 120, which may then forward the information to the wireless A/V recording and communication device 130.

In another example embodiment, determining that the parcel has been left within the area about the wireless A/V recording and communication device 130 may comprise automatic identification and data capture (AIDC). For example, the parcel may include at least one of a barcode 320 (FIG. 16), a matrix code 322 (FIG. 17), a bokode 324 (FIG. 18), and a radio frequency identification (RFID) tag 326 (FIG. 19). AIDC refers to methods of automatically identifying objects, collecting data about them, and entering that data directly into computer systems (e.g. without human involvement). Technologies typically considered part of AIDC include barcodes, matrix codes, bokodes, RFID, biometrics (e.g. iris recognition, facial recognition, voice recognition, etc.), magnetic stripes, Optical Character Recognition (OCR), and smart cards. AIDC is also commonly referred to as "Automatic Identification," "Auto-ID," and "Automatic Data Capture."

AIDC encompasses obtaining external data, particularly through analysis of images and/or sounds. To capture data, a transducer may convert an image or a sound into a digital file. The file is then typically stored and analyzed by a computer, and/or compared with other files in a database, to verify identity and/or to provide authorization to enter a secured system. AIDC also refers to methods of recognizing objects, getting information about them, and entering that data or feeding it directly into computer systems without any human involvement. In biometric security systems, capture may refer to the acquisition of and/or the process of acquiring and identifying characteristics, such as finger images, palm images, facial images, or iris prints, which all may involve video data, or voice prints, which may involve audio data.

Figure 16:
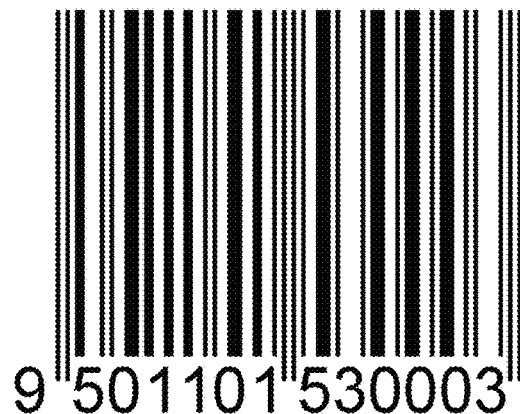
FIG. 16 is a front elevation view of a barcode.

A barcode, such as the example barcode 320 shown in FIG. 16, is an optical machine-readable representation of data relating to the object to which it is attached. Barcodes systematically represent data by varying the widths and spacings of parallel lines, and may be referred to as linear or one-dimensional (1D) barcodes.

Figure 17:
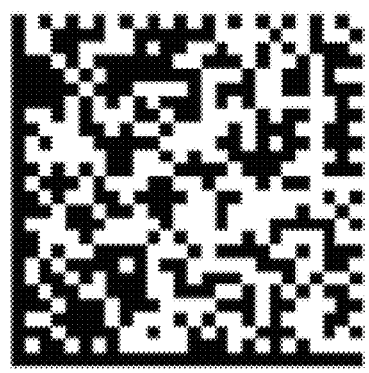
FIG. 17 is a front elevation view of a matrix code.

A matrix code, such as the example matrix code 322 shown in FIG. 17, is a two-dimensional matrix barcode consisting of black and white "cells" or modules arranged in either a square or rectangular pattern. The information encoded can be text and/or numeric data. Quick response (QR) codes and Data Matrix codes are specific types of matrix codes.

Figure 18:
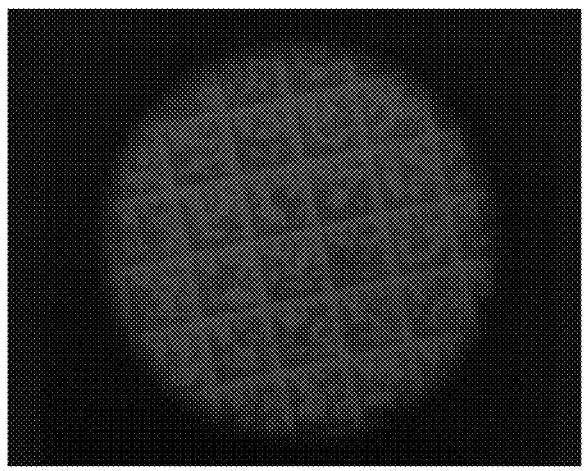
FIG. 18 is a front elevation view of a bokode.
Figure 19:
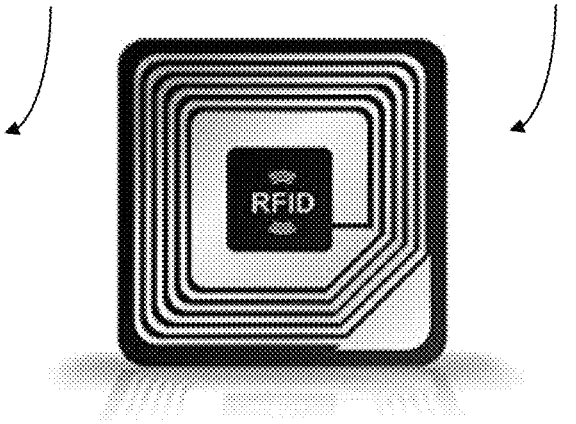
FIG. 19 is a front elevation view of a radio frequency identification (RFID) tag.

A bokode, such as the example bokode 324 shown in FIG. 18, is a type of data tag that holds much more information than a barcode over the same area. The bokode pattern is a tiled series of matrix codes. Bokodes may be circular, and may include an LED covered with a mask and a lens.

Radio-frequency identification (RFID) uses electromagnetic fields to automatically identify and track tags attached to objects. The tags, such as the example RFID tag 326 shown in FIG. 19, contain electronically stored information, and may be passive or active. Passive tags collect energy from a nearby RFID reader's interrogating radio waves. Active tags have a local power source, such as a battery, and may operate at hundreds of meters from the RFID reader. Unlike a barcode, the tag need not be within the line of sight of the reader, so it may be embedded in the tracked object.

The wireless A/V recording and communication device 130 may capture information embedded in one of these types (or any other type) of AIDC technologies. For example, with reference to FIG. 3, the wireless A/V recording and communication device 130 may include an AIDC module 165 operatively connected to the processor 160. The AIDC module 165 may include hardware and/or software configured for one or more types of AIDC, including, but not limited to, any of the types of AIDC described herein. For example, the AIDC module 165 may include an RFID reader (not shown), and the camera 154 of the wireless A/V recording and communication device 130 may in some embodiments be considered to be part of the AIDC module 165. For example, with respect to barcodes, matrix codes, and bokodes (or any other type code), the camera 154 of the wireless A/V recording and communication device 130 may scan the code, and any information embedded therein. To facilitate scanning the code, the parcel carrier may hold the parcel up to the camera 154. With respect to RFID, the RFID reader of the AIDC module 165 may interrogate an RFID tag 326 on, or embedded in, the parcel. In some embodiments, the processor 160 of the wireless A/V recording and communication device 130 may be considered to be part of the AIDC module 165 and/or the processor 160 may operate in conjunction with the AIDC module 165 in various AIDC processes.

AIDC and computer vision have significant overlap, and use of either one of these terms herein should be construed as also encompassing the subject matter of the other one of these terms. For example, the computer vision module 163 and the AIDC module 165 may comprise overlapping hardware components and/or functionality. In some embodiments, the computer vision module 163 and the AIDC module 165 may be combined into a single module.

With reference to FIG. 20, information received by the AIDC module 165 of the wireless A/V recording and communication device 130 from one or more codes or tags may be sent to one or more network devices, such as the server 118 and/or the backend API 120, in an AIDC query signal 330. The one or more network devices may then analyze the sent information and/or compare the sent information with other information in one or more codes databases to determine whether there is a match, for example in order to identify the parcel. If there is a match, then one or more actions may occur, such as the wireless A/V recording and communication device 130 transitioning to a different operational mode. For example, the network device, such as the server 118 and/or the backend API 120, may send an AIDC response signal 332 to the wireless A/V recording and communication device 130. The AIDC response signal 332 may include a command to the wireless A/V recording and communication device 130 to change the operational mode of the wireless A/V recording and communication device 130. For example, the command to the wireless A/V recording and communication device 130 may cause the wireless A/V recording and communication device 130 to transition to an "armed" mode in which the wireless A/V recording and communication device 130 is configured to take one or more actions when the parcel is removed from the area about the wireless A/V recording and communication device 130, as described below.

With further reference to FIG. 14, at block B302 the process determines that the parcel has been removed from the area about the wireless A/V recording and communication device 130. The present embodiments encompass any method of determining that a parcel has been removed from the area about a wireless A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been removed from the area about the wireless A/V recording and communication device 130 may comprise comparing video frames recorded by the camera 154 of the wireless A/V recording and communication device 130. For example, after a parcel has been determined to have been left within the area about the wireless A/V recording and communication device 130, the parcel is likely to remain motionless in the position where it was left. Thus, if the parcel is present within the camera's field of view at a first time (in a first video frame), and is no longer present within the camera's field of view at a second time after the first time (in a second video frame), then the parcel may be determined to have been removed from the area about the wireless A/V recording and communication device 130.

In another example embodiment, determining that the parcel has been removed from the area about the wireless A/V recording and communication device 130 may comprise AIDC. For example, if the parcel includes an RFID tag, then an RFID reader of the AIDC module 165 may detect that the RFID tag no longer responds to interrogation signals. In some embodiments, if the RFID reader sends a threshold number of interrogation signals and receives no response from the RFID tag of the parcel, the process may determine that the parcel has been removed from the area about the wireless A/V recording and communication device 130. In some embodiments, the threshold number of interrogation signals with no response may be one interrogation signal, or two interrogation signals, or three interrogation signals, or any other number of interrogation signals.

With further reference to FIG. 14, at block B304 the process determines whether removal of the parcel from the area about the wireless A/V recording and communication device 130 was authorized. The present embodiments encompass any method of determining whether removal of the parcel from the area about the wireless A/V recording and communication device 130 was authorized, and several examples are provided below. The present embodiments are not, however, limited to these examples, which are provided for illustration only. Any of the examples described below, as well as any of the present embodiments, may include one or more aspects of computer vision.

In one example embodiment, determining whether removal of the parcel from the area about the wireless A/V recording and communication device 130 was authorized may comprise detecting (or tracking) a direction of movement of the parcel. For example, when a parcel is left outside the front entrance of a home, the homeowner (or other occupant) will typically pick up the parcel and bring it inside the home. A parcel thief, by contrast, will typically pick up the parcel and carry it away from the home. Thus, if the wireless A/V recording and communication device 130 detects that the parcel is moving toward a structure to which the wireless A/V recording and communication device 130 is secured (or with which the wireless A/V recording and communication device 130 is associated), then the process may determine that the removal of the parcel from the area about the wireless A/V recording and communication device 130 is authorized. But, if the wireless A/V recording and communication device 130 detects that the parcel is moving away from the structure to which the wireless A/V recording and communication device 130 is secured (or with which the wireless A/V recording and communication device 130 is associated), then the process may determine that the removal of the parcel from the area about the wireless A/V recording and communication device 130 is unauthorized.

In another example embodiment, determining whether removal of the parcel from the area about the wireless A/V recording and communication device 130 was authorized may comprise AIDC and/or computer vision. For example, if an authorized person (e.g. the addressee of the parcel) removes the parcel from the area about the wireless A/V recording and communication device 130, the wireless A/V recording and communication device 130 may receive information from the authorized person. For example, the authorized person may present identification or credentials to the wireless A/V recording and communication device 130. The camera 154 and/or the AIDC module 165 and/or the processor 160 of the wireless A/V recording and communication device 130 may receive information from the identification or credentials for use in determining that the person removing the parcel from the area about the wireless A/V recording and communication device 130 is an authorized person. If no identification or credentials are presented when the parcel is removed from the area about the wireless A/V recording and communication device 130, or if identification or credentials are presented but they do not match an expected identification or credentials, then the process may determine that the person removing the parcel from the area about the wireless A/V recording and communication device 130 is not an authorized person. In some embodiments, the wireless A/V recording and communication device 130 may provide a prompt, such as a voice prompt emitted through the speaker, requesting identification or credentials when a person is detected within the area about the wireless A/V recording and communication device 130 and/or when the wireless A/V recording and communication device 130 detects that the parcel has been moved or picked up.

Examples of identification or credentials that could be used in the foregoing processes include, without limitation, a card (or other carrier or substrate) bearing a barcode 320, or a matrix code 322, or a bokode 324, or an RFID tag 326, or an embedded integrated circuit (such as in a smart card, a chip card, or an integrated circuit card (ICC)), or a magnetic stripe. FIG. 21 illustrates an example of a smart card 340 including an embedded integrated circuit 342, and FIG. 22 illustrates an example of a card 344 including a magnetic stripe 346.

A smart card, chip card, or integrated circuit card (ICC), such as the example smart card 340 shown in FIG. 21, is any pocket-sized card that has one or more embedded integrated circuits. Smart cards may be either contact or contactless. Contact smart cards include a contact area comprising contact pads. These pads provide electrical connectivity when inserted into a reader, which serves as a communication medium between the smart card and a host (e.g., a computer, or a point of sale terminal). Contact smart cards do not contain batteries. Instead, power is supplied by the card reader. With contactless smart cards, the card communicates with and is powered by the reader through RF induction technology. These cards require only proximity to an antenna to communicate. Like contact smart cards with, contactless cards do not have an internal power source. Instead, they use an inductor to capture some of the incident radio-frequency interrogation signal, rectify it, and use it to power the card's electronics.

A magnetic stripe card, such as the example card 344 shown in FIG. 22, is a type of card capable of storing data by modifying the magnetism of tiny iron-based magnetic particles on a band of magnetic material on the card. The magnetic stripe, sometimes called a magstripe, is read by swiping past a magnetic reading head.

Further examples of identification or credentials that could be used in the foregoing processes include, without limitation, a card (or other carrier or substrate) bearing text that can be received as input by the AIDC module 165 and/or the camera 154 and/or the processor 160 through optical character recognition (OCR). OCR is the mechanical or electronic conversion of images of typed, handwritten, or printed text into machine-encoded text.

Further examples of AIDC and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who removes the parcel from the area about the wireless A/V recording and communication device 130. For example, the computer vision module 163, the AIDC module 165, and/or the camera 154 and/or the processor 160 may receive information about the person using any one, or any combination of more than one, of the foregoing biometrics.

Another aspect of determining whether removal of the parcel from the area about the wireless A/V recording and communication device 130 was authorized may comprise comparing information received through the AIDC (and/or computer vision) to information about one or more persons. With reference to FIG. 20, information received by the AIDC module 165 (and/or the computer vision module 163) and/or the camera 154 and/or the processor 160 of the wireless A/V recording and communication device 130 may be sent to one or more network devices, such as the server 118 and/or the backend API 120, in an AIDC query signal 330. The one or more network devices may then compare information in the AIDC query signal 330 about the person detected in the area about the wireless A/V recording and communication device 130 with information from one or more sources. These information sources may include one or more databases and/or services. For example, a database and/or service may include a smart list of authorized persons. If a person who removed the parcel is on the smart list of authorized persons, then the removal of the parcel from the area about the wireless A/V recording and communication device 130 may be determined to be authorized.

In some embodiments, the information in the AIDC query signal 330 may be compared with information about one or more persons who are authorized to remove parcels from the area about the wireless A/V recording and communication device 130. For example, biometric information (or other AIDC/computer vision information) about one or more authorized persons may be uploaded and stored at one or more databases and/or services accessible to the one or more network devices, such as the server 118 and/or the backend API 120. Comparison(s) between this information and the information in the AIDC query signal 330 may determine whether a person detected in the area about the wireless A/V recording and communication device 130 is an authorized person or not. The comparison(s) may be performed by one or more network devices, such as the server 118 and/or the backend API 120, for example.

In other embodiments, the information in the AIDC query signal 330 may be compared with information about one or more persons who have been reported in connection with one or more crimes and/or suspicious events. In some embodiments, the crime(s) and/or suspicious event(s) may have occurred within a defined radius of the wireless A/V recording and communication device 130. For example, a first user of a wireless A/V recording and communication device may view video footage that was recorded by his or her device and determine that the person or persons in the video footage are, or may be, engaged in suspicious activity and/or criminal activity. The first user may then share that video footage with one or more other people, such as other users of wireless A/V recording and communication devices, and/or one or more organizations, including one or more law enforcement agencies. The present embodiments may leverage this shared video footage for use in comparing with the information in the AIDC query signal 330 to determine whether a person detected in the area about the wireless A/V recording and communication device 130 is the same person that was the subject of (and/or depicted in) the shared video footage. If a person detected in the area about the wireless A/V recording and communication device 130 is the same person that was reported in connection with one or more crimes and/or suspicious events, then that person is probably not a person who is authorized to remove parcels from the area about the wireless A/V recording and communication device 130. In some embodiments, the person (or persons) depicted in the shared video footage may be a perpetrator(s) of one or more parcel thefts. Further, those parcel thefts may have occurred within a defined radius about the wireless A/V recording and communication device 130. Further description of sharing video footage from wireless A/V recording and communication devices is provided in US patent application Ser. No. 62/288,971 (filed on Jan. 29, 2016 and entitled "SHARING VIDEO FOOTAGE FROM WIRELESS AUDIO/VIDEO RECORDING AND COMMUNICATION DEVICES") and 62/300,547 (filed on Feb. 26, 2016 and entitled "SHARING VIDEO FOOTAGE FROM WIRELESS AUDIO/VIDEO RECORDING AND COMMUNICATION DEVICES"), both of which are incorporated herein by reference in their entireties as if fully set forth.

In another example embodiment, AIDC and/or computer vision may comprise the camera 154 of the wireless A/V recording and communication device 130 capturing an image of a person in the area about the wireless A/V recording and communication device 130. The image of the person may comprise an image of the person's face. The image of the person's face may be compared with image(s) of the face(s) of at least one other person. In some embodiments, the at least one other person may be a person or persons who were reported in connection with suspicious activity and/or criminal activity, such as parcel theft. The comparison(s) may be performed by one or more network devices, such as the server 118 and/or the backend API 120. If a match is found between the image of the person's face captured by the camera 154 of the wireless A/V recording and communication device 130 and the at least one image of the face(s) of at least one other person, then the process may determine that removal of the parcel from the area about the wireless A/V recording and communication device 130 was unauthorized. The process may then generate an alert, which may comprise any or all of the alert types described herein.

With further reference to FIG. 20, the network device, such as the server 118 and/or the backend API 120, may send an AIDC response signal 332 to the wireless A/V recording and communication device 130. In some embodiments, the AIDC response signal 332 may be sent after a comparison has been made between the information in the AIDC query signal 330 and the information about one or more persons who are authorized to remove parcels from the area about wireless A/V recording and communication device 130 and/or the information about one or more persons who have been reported in connection with one or more crimes and/or suspicious events. The AIDC response signal 332 may comprise an indicator (and/or information) about whether a person detected in the area about the wireless A/V recording and communication device 130 is authorized to remove parcels from that area or not.

With further reference to FIG. 14, at block B306, when the removal of the parcel from the area about the wireless A/V recording and communication device 130 is determined to have been unauthorized, the process may generate an alert. In some embodiments, the alert may comprise an alert signal sent to a client device. For example, the alert may be similar to, or the same as, the process described above with respect to block B268 of FIG. 2, in which audio and/or video data is transmitted (streamed) from the wireless A/V recording and communication device 130 to the user's client device 114 via the user's wireless network 110 and the network 112. The streaming video may include images of the person(s) who was/were determined to have been unauthorized. The user can then determine whether to take further action, such as alerting law enforcement and/or sharing the video footage with other people, such as via social media.

In some embodiments, the alert may comprise an audible alarm emitted from the speaker 152 of the wireless A/V recording and communication device 130. The audible alarm may be any loud noise likely to attract attention and/or startle the unauthorized person, making it more likely that he or she will flee without absconding with the parcel(s). In some embodiments, the alert may comprise an announcement emitted from the speaker 152 of the wireless A/V recording and communication device 130. The announcement may comprise a verbal warning that the area about the wireless A/V recording and communication device 130 is being recorded. The unauthorized person, upon being informed that the area about the wireless A/V recording and communication device 130 is being recorded, may decide to flee the scene without absconding with the parcel(s). In some embodiments, the alert may comprise both an audible alarm and an announcement in combination. Also in some embodiments, the alert may comprise any combination of an alert signal sent to a client device, an audible alarm emitted from the speaker 152 of the wireless A/V recording and communication device 130, and an announcement emitted from the speaker 152 of the wireless A/V recording and communication device 130.

Some of the present embodiments may comprise identifying a parcel within the area about the wireless A/V recording and communication device 130. In some embodiments, identifying the parcel may comprise the camera 154 of the wireless A/V recording and communication device 130 capturing an image of an identifying mark on the parcel. In various embodiments, the identifying mark may be, for example, a company logo or other identifying symbol. The identifying mark on the parcel may be compared with a plurality of identifying marks in a database. If a match is found, the parcel may be identified as originating with the sender associated with the matching identifying mark. In other embodiments, the identifying mark may be, for example, a barcode, a matrix code, a bokode, etc. In some embodiments, RFID (or other similar technology) may be used to identify a parcel.

FIG. 23 illustrates an example embodiment of a process for deterring parcel theft with a wireless A/V recording and communication device according to various aspects of the present disclosure. At block B350, the process may determine that a parcel has been left within an area about a wireless A/V recording and communication device, such as the wireless A/V recording and communication device 130 described above. The present embodiments encompass any method of determining that a parcel has been left within an area about a wireless A/V recording and communication device, including any of the examples described above. The present embodiments are not, however, limited to these examples, which are provided for illustration only.

With further reference to FIG. 23, at block B352, after the parcel has been left within the area about the wireless A/V recording and communication device 130, the process may detect a person within the area about the wireless A/V recording and communication device 130. The detection of the person within the area about the wireless A/V recording and communication device 130 may be according to any of the processes described herein, such as, for example, comparing video frames recorded by the camera 154 of the wireless A/V recording and communication device 130.

With further reference to FIG. 23, at block B354 the process may record, with the camera 154 of the wireless A/V recording and communication device 130, video images of the person within the area about the wireless A/V recording and communication device 130. At block B356, the process may emit an alert from the speaker 152 of the wireless A/V recording and communication device 130. The alert may comprise an audible alarm and/or an announcement, similar to the example embodiments described above.

In any of the present embodiments, various aspects of methods may be performed locally, e.g. by one or more components of the wireless A/V recording and communication device 130, and/or remotely, e.g. by one or more network devices, such as the server 118 and/or the backend API 120, for example. For example, the processor 160 of the wireless A/V recording and communication device 130 may perform various aspects such as, but not limited to, comparing video frames recorded by the camera 154 of the wireless A/V recording and communication device 130 to determine whether a parcel has been left within the area about the wireless A/V recording and communication device 130 and/or that the parcel has been removed from the area about the wireless A/V recording and communication device 130.

Many of the present embodiments have been described with reference to persons detected by, or present in the area about, the wireless A/V recording and communication device 130. The present embodiments are not limited, however, to scenarios involving humans. For example, the present embodiments contemplate that a parcel thief need not be a human. A parcel theft bot or drone, for example, may be encompassed by any of the present embodiments. For example, in a process similar to any process described herein, after a parcel has been left within the area about the wireless A/V recording and communication device 130, the process may detect a parcel theft bot or drone within the area about the wireless A/V recording and communication device 130. The process may also record, with the camera 154 of the wireless A/V recording and communication device 130, video images of the parcel theft bot or drone within the area about the wireless A/V recording and communication device 130.

Any of the present embodiments may comprise a designated parcel delivery area. For example, a user may designate a particular area about the wireless A/V recording and communication device 130 as a parcel delivery area. The parcel delivery area may be demarcated in any suitable manner, such as with markings and/or text provided on the pavement and/or adjacent wall(s). Processes of determining whether a parcel has been left within the area about the wireless A/V recording and communication device 130 and/or determining whether the parcel has been removed from the area about the wireless A/V recording and communication device 130 may comprise determining whether an object has been left within and/or removed from the designated parcel delivery area. The user may, in some embodiments, direct or aim the camera 154 of the wireless A/V recording and communication device 130 toward the designated parcel delivery area to facilitate determining whether an object has been left within and/or removed from the designated parcel delivery area.

As described above, one aspect of the present embodiments includes the realization that parcel pilferage is a pernicious and persistent problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves.

Another aspect of the present embodiments includes the realization that users of A/V recording and communication devices may share video footage recorded by their devices to deter parcel theft. For example, an A/V recording and communication device may be configured to monitor a drop-off zone, determine when a parcel theft has occurred, and generate a parcel theft share signal to alert his or her neighbors of the parcel theft. In some embodiments, the A/V recording and communication device may transmit the parcel theft share signal as soon as the A/V recording and communication device recognizes that a parcel theft has occurred. Further, the parcel theft share signal may include image data captured of the drop-off zone that may include image data of the parcel and/or the thief in the act. Moreover, the parcel theft share signal may also include parcel tracking data such as (but not limited to) automatic identification and data capture (AIDC) data, geographical location data, a time-stamp, or any other data that may be used to track the parcel and/or to identify and apprehend the parcel thief or thieves. In another example, the parcel theft share signal may be transmitted to a backend server, where the backend server may generate a parcel theft alert that includes data from the parcel theft share signal such as (but not limited to) image data and/or parcel tracking data. In many embodiments, the backend server may further transmit the parcel theft alert to various client devices associated with various users within the network of users and/or law enforcement agencies. The present embodiments provide these and other advantages and enhancements, as described below.

Figure 24:
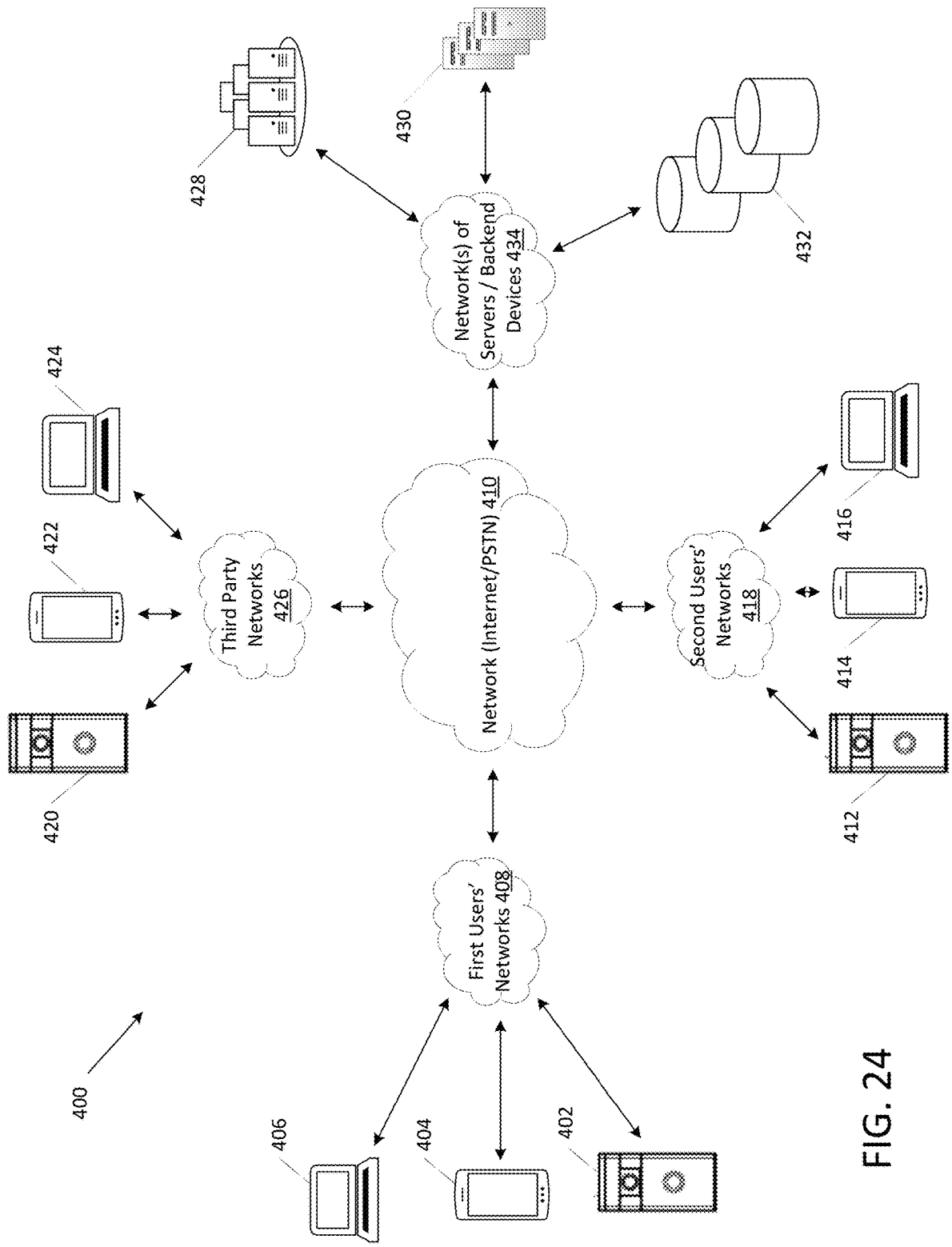
FIG. 24 is a functional block diagram illustrating a system for communicating in a network according to various aspects of the present disclosure.

FIG. 24 is a functional block diagram illustrating a system 400 for communicating in a network using a parcel theft share signal. In many embodiments, A/V recording and communication devices may be configured to monitor a drop-off zone by determining when a parcel has been placed in the drop-off zone and when a parcel has been removed from the drop-off zone. In some embodiments, the A/V recording and communication device may determine that the parcel has been removed from the drop-off zone using image data captured by a camera of the A/V recording and communication device and/or parcel tracking data such as (but not limited to) RFID data, a barcode, a matrix code, or a bokode. In various embodiments, the A/V recording and communication device may be further configured to determine whether removal of the parcel from the drop-off zone was authorized. Further, the A/V recording and communication device may be configured to generate a parcel theft share signal using the image data of the drop-off zone and/or the parcel tracking data to warn neighbors of parcel thefts. In some embodiments, the parcel theft share signal may be generated by the A/V recording and communication device as soon as it is determined that the parcel has been removed from the drop-off zone. In some embodiments, the parcel theft share signal may be transmitted to one or more backend devices, such as a backend server, where the backend server may generate a parcel theft alert based on the parcel theft share signal. In some embodiments, the backend server may identify and transmit the parcel theft alert to one or more client devices associated a user of the network of users, as further described below.

In reference to FIG. 24, the system 400 may include one or more first audio/video (A/V) recording and communication devices 402 configured to access a first users' network 408 to connect to a network (Internet/PSTN) 410. The system 400 may also include one or more first client devices 404, 406, which in various embodiments may be configured to be in network communication with the first A/V recording and communication device 402. The first client devices 404, 406 may comprise, for example, a mobile phone such as a smartphone, or a computing device such as a tablet computer, a laptop computer, a desktop computer, etc. The first client devices 404, 406 may include any or all of the components and/or functionality of the client device 114 and/or the client device 800 described herein. In some embodiments, the first client devices 404, 406 may not be associated with a first A/V recording and communication device.

In various embodiments, the system 400 may also include one or more second A/V recording and communication devices 412 connected to the network (Internet/PSTN) 410 using a second users' network 418 to access the network (Internet/PSTN) 410. The system 400 may further include one or more second client devices 414, 416, which in various embodiments may be configured to be in network communication with the second A/V recording and communication device 412. The second client devices 414, 416 may comprise, for example, a mobile phone such as a smartphone, or a computing device such as a tablet computer, a laptop computer, a desktop computer, etc. The second client devices 414, 416 may include any or all of the components and/or functionality of the client device 114 and/or the client device 800 described herein. In some embodiments, the second client devices 414, 416 may not be associated with a second A/V recording and communication device.

In some embodiments, the system 400 may also include one or more third party A/V recording and communication devices 420 connected to the network (Internet/PSTN) 410 using various third party networks 426 such as a local network, a wireless network such as a cellular/mobile network and/or a Wi-Fi network, a wired network such as an Ethernet network, a public network, a low-bandwidth network, and/or any other appropriate network to access the network (Internet/PSTN) 410. The system 400 may further include one or more third party client devices 422, 424, which in various embodiments may be configured to be in network communication with the third party A/V recording and communication device 420. The third party client devices 422, 424 may comprise, for example, a mobile phone such as a smartphone, or a computing device such as a tablet computer, a laptop computer, a desktop computer, etc. The third party client devices 422, 424 may include any or all of the components and/or functionality of the client device 114 and/or the client device 800 described herein. In some embodiments, the third party client devices 422, 424 may not be associated with a third party A/V recording and communication device.

Figure 37:
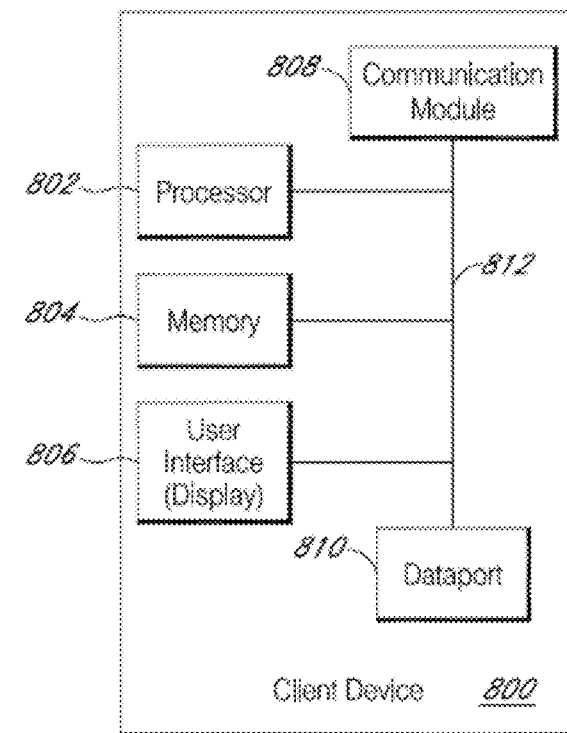
FIG. 37 is a functional block diagram of a client device on which the present embodiments may be implemented according to various aspects of the present disclosure.

With further reference to FIG. 24, the system 400 may also include various backend devices such as (but not limited to) storage devices 432, backend servers 430, and backend APIs 428 in network communication with the first, second, and third party A/V communication devices 402, 412, 420 and their respective client devices 404, 406, 414, 416, 422, 424. In some embodiments, the storage devices 432 may be a separate device from the backend servers 430 (as illustrated) or may be an integral component of the backend servers 430. In addition, the first and second users' networks 408, 418 and the network 410 may be similar in structure and/or function to the user's network 110 and the network 112 (FIG. 1), respectively. In some embodiments, the first and second A/V recording and communication devices 402, 412 may be similar in structure and/or function to the A/V recording and communication device 100 (FIG. 1) and/or the A/V recording and communication doorbell 130 (FIGS. 3-13). In some embodiments, the first user's client devices 404, 406 may be similar in structure and/or function to the user's client device 114 (FIG. 1) and/or the user's client device 800 (FIG. 37). The second user's client devices 414, 416 may also be similar in structure and/or function to the user's client device 114 (FIG. 1) and/or the user's client device 800 (FIG. 37). Also, the storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 25:
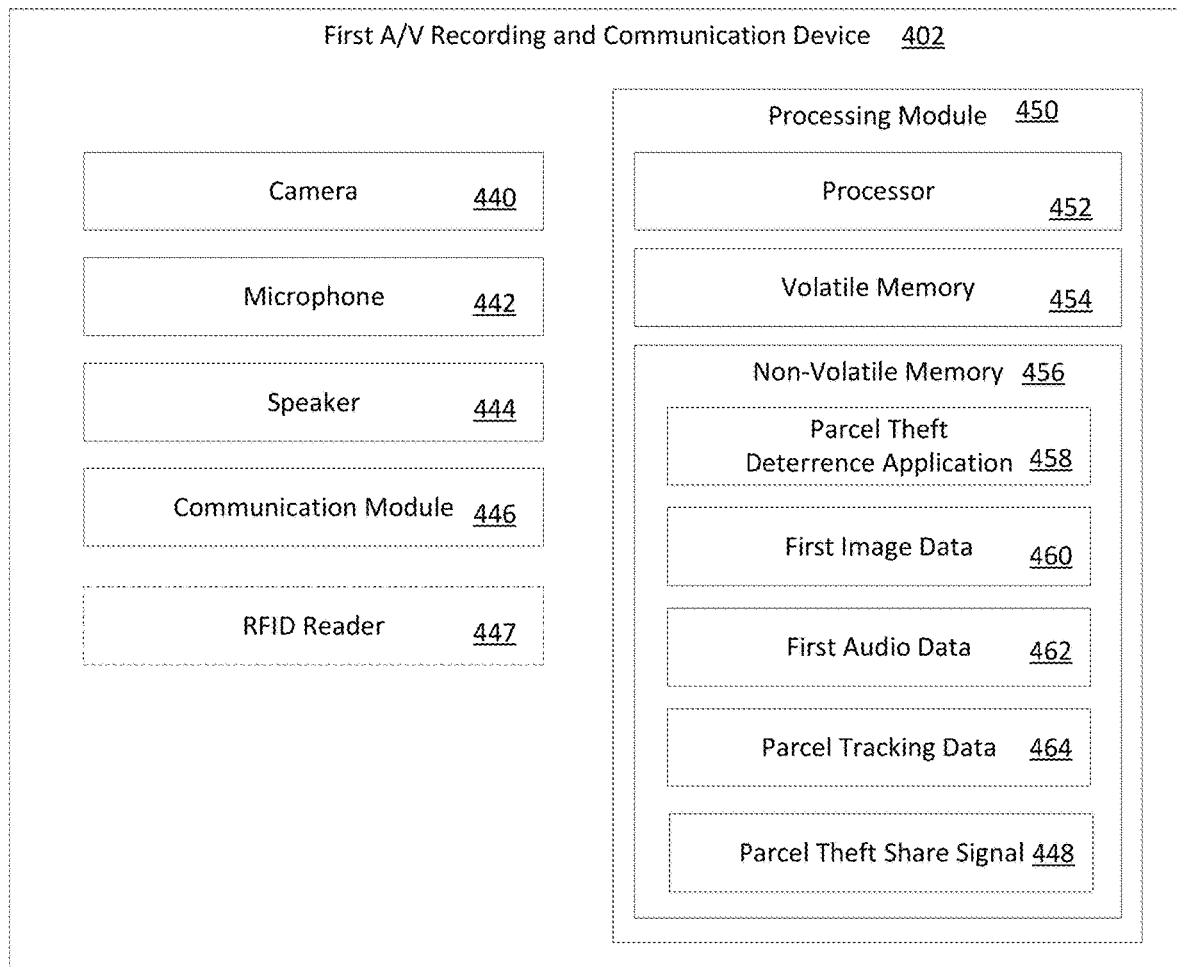
FIG. 25 is a functional block diagram illustrating one embodiment of a first A/V recording and communication device according to various aspects of the present disclosure.

FIG. 25 is a functional block diagram illustrating an embodiment of the first A/V recording and communication device 402 according to various aspects of the present disclosure. The first A/V recording and communication device 402 may comprise a processing module 450 that is operatively connected to a camera 440, a microphone 442, a speaker 444, and a communication module 446. In some embodiments, the processing module 450 may also be operatively connected to a radio-frequency identification (RFID) reader. The processing module 450 may comprise a processor 452, volatile memory 454, and non-volatile memory 456 that includes a parcel theft deterrence application 458. In various embodiments, the parcel theft deterrence application 458 may configure the processor 452 to capture first image data 460 using the camera 440 and first audio data 462 using the microphone 442. In addition, the parcel theft deterrence application 458 may configure the processor 452 to monitor a drop-off zone and determine when a parcel has been removed from the drop-off zone using the first image data 460, as further described below. The parcel theft deterrence application 458 may also configure the processor 452 to monitor the drop-off zone and determine when a parcel has been removed from the drop-off zone using the RFID reader 447, as further described below. In some embodiments, the non-volatile memory 456 may also include parcel tracking data 464 such as (but not limited to) automatic identification and data capture (AIDC) data that is associated with the parcel, as described above. In many embodiments, the parcel theft deterrence application 458 may configure the processor 452 to generate a parcel theft share signal 448 using the first image data 460, first audio data 462, and/or the parcel tracking data 464. In some embodiments, the parcel theft share signal 448 may be transmitted, using the communication module 446, to the first client device 404, 406, and the first client device 404, 406 may send the parcel theft share signal 448 to the backend server 430. In other embodiments, the parcel theft share signal 448 may be transmitted directly to the backend server 430 using the communication module 446. In either embodiment, the backend server 430 may use the parcel theft share signal 448 to generate a parcel theft alert to deter parcel theft in a variety of ways, as further described below.

Figure 26:
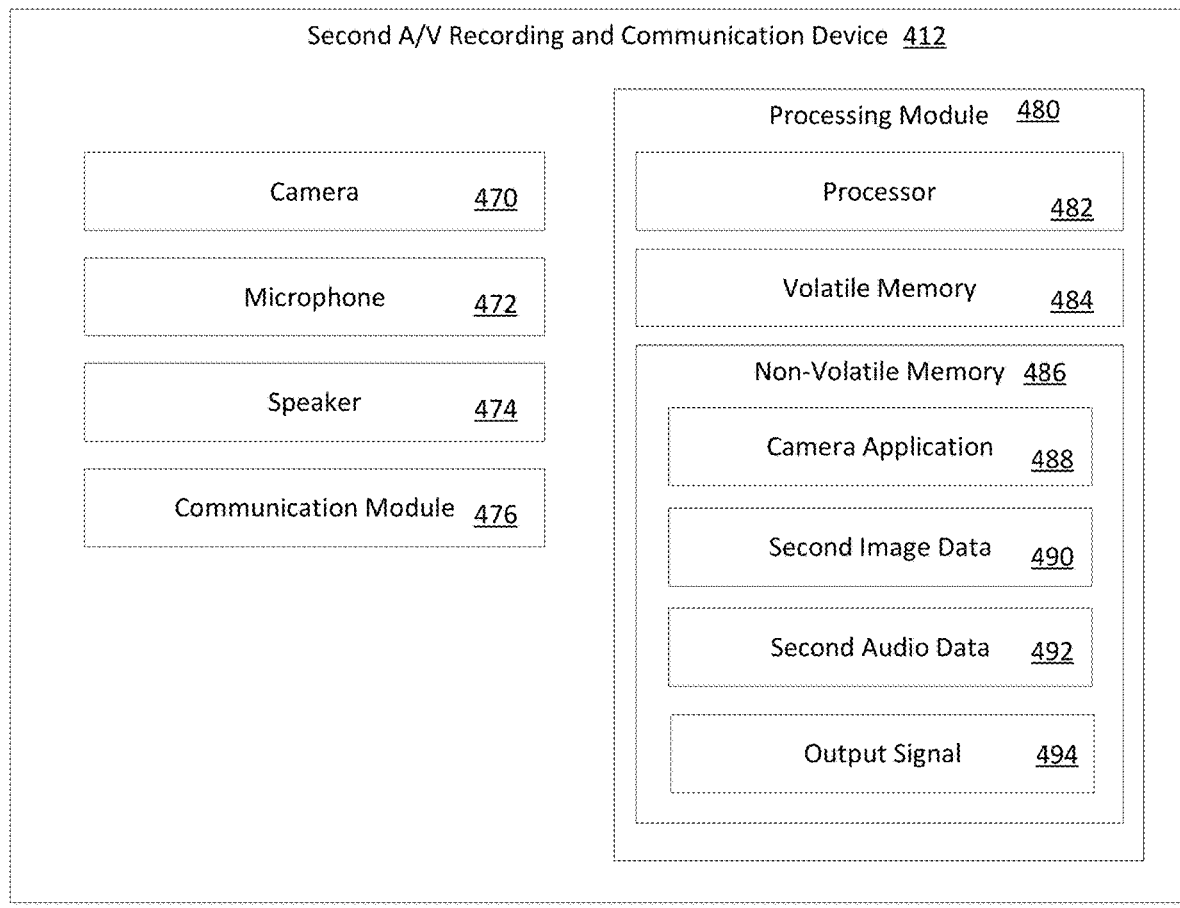
FIG. 26 is a functional block diagram illustrating one embodiment of a second A/V recording and communication device according to various aspects of the present disclosure.

FIG. 26 is a functional block diagram illustrating an embodiment of the second A/V recording and communication device 412 according to various aspects of the present disclosure. The second A/V recording and communication device 412 may comprise a processing module 480 that is operatively connected to a camera 470, a microphone 472, a speaker 474, and a communication module 476. The processing module 480 may comprise a processor 482, volatile memory 484, and non-volatile memory 486 that includes a camera application 488. In some embodiments, the camera application 488 may configure the processor 482 to capture second image data 490 using the camera 470 and second audio data 492 using the microphone 472. In various embodiments, the camera application 488 may also configure the processor to generate and transmit an output signal 494 that may include the second image data 490 and/or the second audio data 492. In some embodiments, the output signal 494 may be transmitted, using the communication module 476, to the second client device 414, 416, and the second client device 414, 416 may send the output signal 494 to the backend server 430. In other embodiments, the output signal 494 may be transmitted directly to the backend server 430 using the communication module 476. In either embodiment, the backend server 430 may use the output signal 494 to generate a parcel theft alert, as further described below.

In reference to FIGS. 25 and 26, the image data 460, 490 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. In addition, a communication module, such as the communication modules 446, 476 may comprise (but is not limited to) one or more transceivers and/or wireless antennas (not shown) configured to transmit and receive wireless signals. In further embodiments, the communication modules 446, 476 may comprise (but are not limited to) one or more transceivers configured to transmit and receive wired and/or wireless signals.

Figure 27:
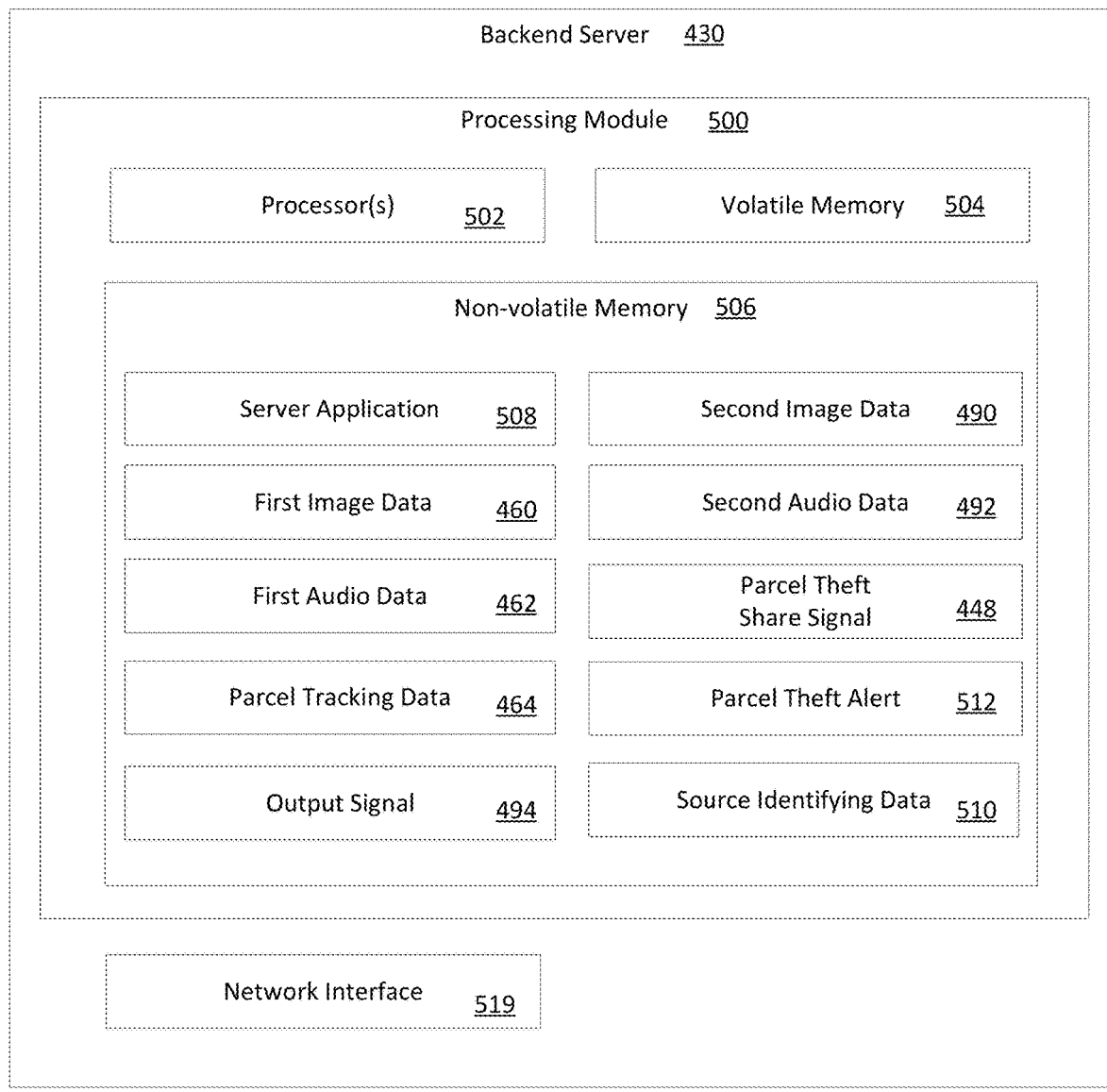
FIG. 27 is a functional block diagram illustrating one embodiment of a backend device according to various aspects of the present disclosure.

FIG. 27 is a functional block diagram illustrating one embodiment of a backend server 430 according to various aspects of the present disclosure. The backend server 430 may comprise a processing module 500 including a processor 502, volatile memory 504, a network interface 519, and non-volatile memory 506. The network interface 519 may allow the backend server 430 to access and communicate with devices connected to the network (Internet/PSTN) 410. The non-volatile memory 506 may include a server application 508 that configures the processor 502 to receive the parcel theft share signal 448 and generate a parcel theft alert 512 using the parcel theft share signal 448, as further described below. In various embodiments, the parcel theft share signal 448 may include first image data 460 and/or first audio data 462 received from the first A/V recording and communication device 402 and/or the first client device 404, 406. Further, the non-volatile memory 506 may include an output signal 494 that includes second image data 490 and/or second audio data 492 received from the second A/V recording and communication device 412 and/or second client device 414, 416. In some embodiments, the backend server 430 may generate the parcel theft alert 512 using the first image data 460 and/or the parcel tracking data 464, as further described below. In various embodiments, the backend server 430 may be configured to match a person depicted in the first image data 460 with a person depicted in the second image data 490 and generate the parcel theft alert 512 using the first image data 460, second image data 490, and/or information regarding the person, as further described below. In some embodiments, the second image data 490 and/or the second audio data 492 may be separately stored at the backend databases 432, where the backend server 430 may access the backend databases 432 for generating the parcel theft alert 512.

In further reference to FIG. 27, the non-volatile memory 506 may also include source identifying data 510 that may be used to determine locations of the first A/V recording and communication device 402, the second A/V recording and communication device 412, and/or the third party A/V recording and communication device 420. In addition, the source identifying data 510 may be used to determine locations of the first client devices 404, 406, the second client devices 414, 416, and/or the third party devices 422, 424. In some embodiments, the server application 508 may configure the processor 502 to generate and transmit the parcel theft alert 512 to a third party client device 422, 424 and/or a law enforcement agency that includes information indicating an approximate location of where the first image data 460 was captured and/or where the second image data 490 was captured, as further described below.

In the illustrated embodiment of FIGS. 25-27, the various components including (but not limited to) the processing modules 450, 480, 500, the communication modules 446, 76, and the network interface 519 are represented by separate boxes. The graphical representations depicted in each of FIGS. 25-27 are, however, merely examples, and are not intended to indicate that any of the various components of the first A/V recording and communication device 402, the second A/V recording and communication device 412, or the backend server 430 are necessarily physically separate from one another, although in some embodiments they might be. In other embodiments, however, the structure and/or functionality of any or all of the components of first A/V recording and communication device 402 may be combined. In addition, in some embodiments the communication module 446 may include its own processor, volatile memory, and/or non-volatile memory. Likewise, the structure and/or functionality of any or all of the components of the second A/V recording and communication device 412 may be combined. In addition, in some embodiments the communication module 476 may include its own processor, volatile memory, and/or non-volatile memory. Further, the structure and/or functionality of any or all of the components of the backend server 430, may be combined. In addition, in some embodiments the network interface 519 may include its own processor, volatile memory, and/or non-volatile memory.

Figure 28:
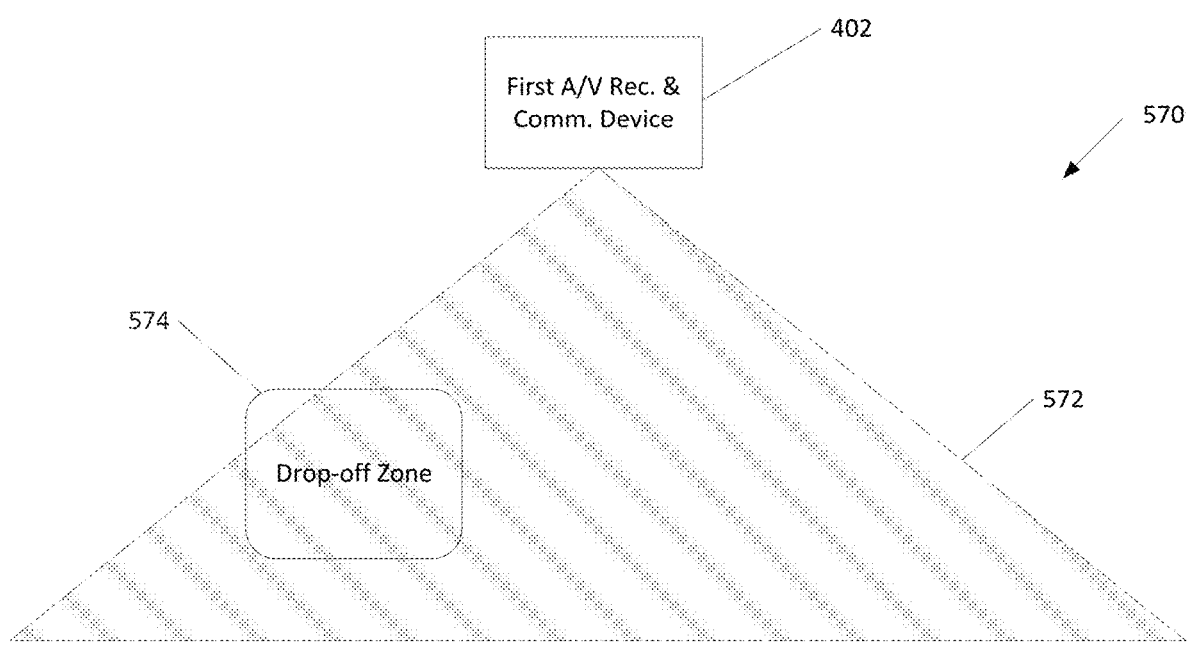
FIG. 28 is a schematic diagram illustrating an embodiment of a first A/V recording and communication device configured for sharing video footage for parcel theft deterrence according to an aspect of the present disclosure.

FIG. 28 is a schematic diagram illustrating an embodiment of a first A/V recording and communication device 402 configured for sharing video footage for parcel theft deterrence according to an aspect of the present disclosure. The diagram 570 indicates a drop-off zone 574, which may in some embodiments comprise an area that a user has designated for parcels to be left upon delivery. The drop-off zone 574 may be any area that the user designates as the desired location for the parcel to be delivered including (but not limited to) an area about the first A/V recording and communication device 402 or any designated parcel delivery area. In some embodiments, the drop-off zone 574 may be marked with a sign, paint, tape, and/or any other kind or type of marker (not shown) so that it is easily identifiable to a parcel delivery carrier. In some embodiments, the drop-off zone 574 may be an area that is not visible from the street, such as behind some bushes, shrubbery, or other vegetation and/or behind a wall or other structure.

In some embodiments, the drop-off zone 574 may not be designated in advance of a parcel delivery, but may instead comprise the location where the parcel is left by the carrier, wherever that location may be. For example, the first A/V recording and communication device 402 may be configured to detect the delivery of the parcel using a computer vision (or the like) process and/or AIDC (or the like), and to then monitor the delivered parcel. In such embodiments, the drop-off zone 574 comprises whatever location at which the parcel has been left by the carrier, whether or not that location was predesignated by the user.

The diagram 570 of FIG. 28 also indicates a field of view 572 for the camera 440 of the first A/V recording and communication device 402. The field of view 572 of the camera 440 at least overlaps the drop-off zone 574, such that the camera 440 is configured to capture first image data 460 of the drop-off zone 574. In some embodiments, the field of view 572 of the camera 440 may completely cover the drop-off zone 574, such that no portion of the drop-off zone 574 is outside the field of view 572 of the camera 460. In various embodiments, the field of view 572 may also capture first image data 460 that includes parcel tracking data 464 that may be used to generate a parcel theft share signal 448, as further described below. Although the specific field of view 572 and the drop-off zone 576 are discussed above with respect to FIG. 28, any of a variety of fields of view and camera arrangements as appropriate to the aspects of a specific application can be used in accordance with embodiments of the present disclosure.

Figure 29:
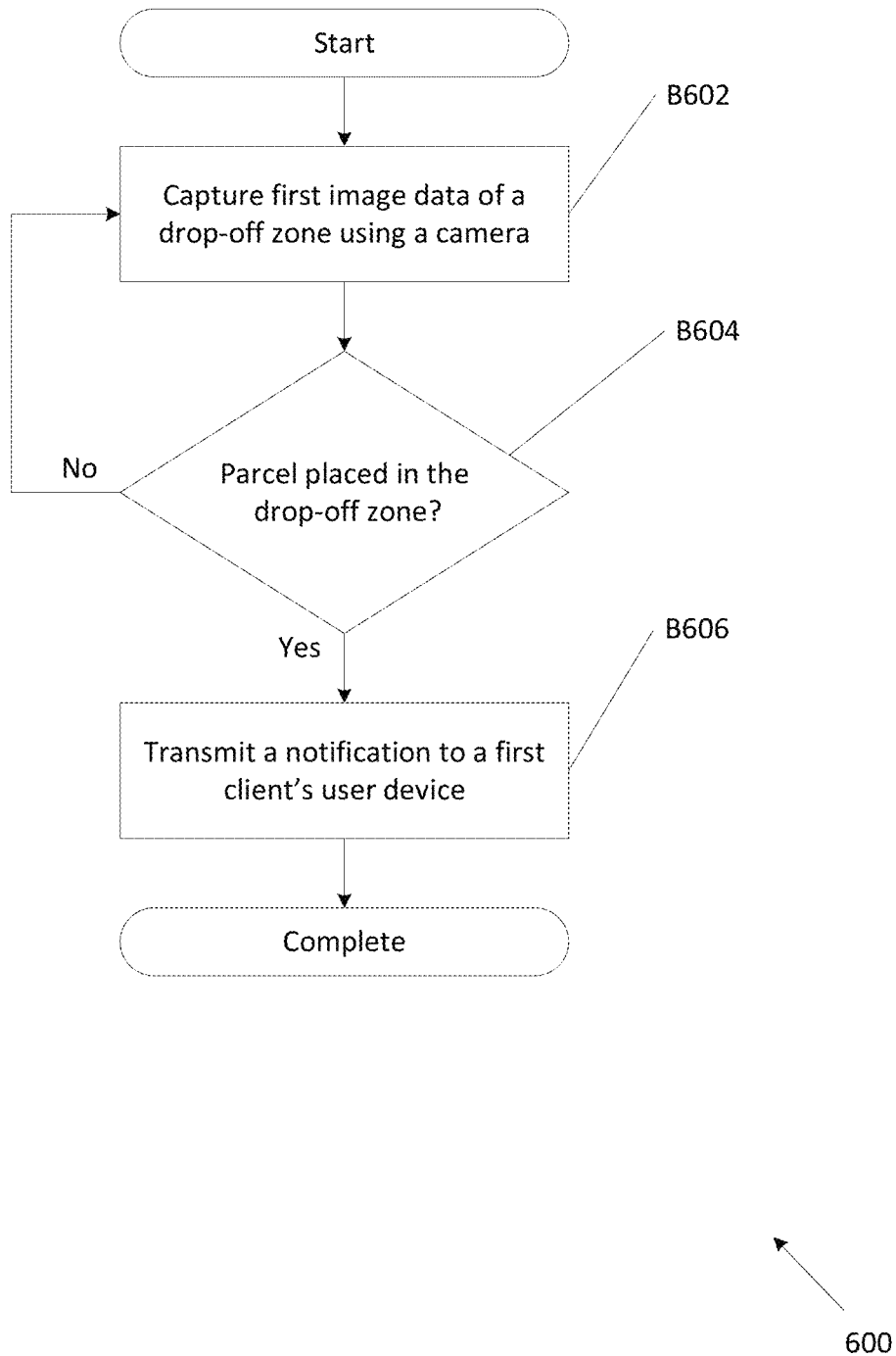
FIG. 29 is a flowchart illustrating one embodiment of a process for monitoring a drop-off zone using a first A/V recording and communication device according to an aspect of the present disclosure.

FIG. 29 is a flowchart illustrating one embodiment of a process for monitoring a drop-off zone using the first A/V recording and communication device 402 according to an aspect of the present disclosure. The process 600 may include capturing (block B602) first image data 460 of the drop-off zone 576 using the camera 440, where the camera 440 may be configured to have a field of view that includes the drop-off zone 576, as described above with reference to FIG. 28. In further reference to FIG. 29, the process 600 may also include determining (block B604) when a parcel has been placed in the drop-off zone 576 using the first image data 460 of the drop-off zone 576 captured by the camera 440, as further described below. If it is determined that the parcel has not been placed in the drop-off zone 576, then the process 600 may continue to capture (block B602) first image data 460 of the drop-off zone 576 using the camera 440. If, however, it has been determined that the parcel has been placed in the drop-off zone 576, the process 600 may include transmitting (block B606) a notification to the first client device(s) 404, 406, using the communication module 446, that the parcel has been placed in the drop-off zone 576.

In further reference to FIG. 29, in some embodiments the determination (block B604) when the parcel has been placed in the drop-off zone 576 may include comparing the first image data 460 of the drop-off zone 576 captured by the camera 440 at a first time and the first image data 460 of the drop-off zone 576 captured by the camera 440 at a second time after the first time. Further, the determination (block B604) that the parcel has been placed in the drop-off zone 576 may include using the parcel tracking data 464 such as (but not limited to) the AIDC data located on or within the parcel. As described above, the AIDC data may include (but is not limited to) barcodes, matrix codes, and/or bokodes. In such embodiments, the first image data 460 of the drop-off zone 576 captured by the camera 440 may include the AIDC data. In some embodiments, AIDC data on or within the parcel may also be captured by the camera 440 before the parcel is placed in the field of view 576 of the camera 440. In various embodiments, the AIDC data may include RFID data, as described above. In such embodiments, the first A/V recording and communication device 402 may include an RFID reader 447 configured to capture RFID data 464 from an active or passive RFID tag located on or within the parcel. In some embodiments, the RFID reader 447 may be configured to interrogate a passive RFID tag located on the parcel by using electromagnetic fields, where the passive RFID tags may collect energy from the RFID reader's 447 interrogating radio waves and return electronically stored information to the RFID reader 447 regarding the parcel being delivered. In other embodiments, the RFID reader 447 may be configured to capture RFID data from active RFID tags, where active RFID tags may include a local power source, such as (but not limited to) a battery, and return electronically stored information to the RFID reader 447 regarding the parcel being delivered. The passive and/or active RFID tags may be attached to the parcel including being placed on the outer surface of the parcel, within the parcel, and/or attached to the parcel. Typically, the RFID data may be captured by the RFID reader 447 even if the RFID tag is not in the field of view 576 of the camera 440. The information obtained by the RFID reader 447 may be used in one or more subsequent processes, such as any of the processes described herein.

Figure 30:
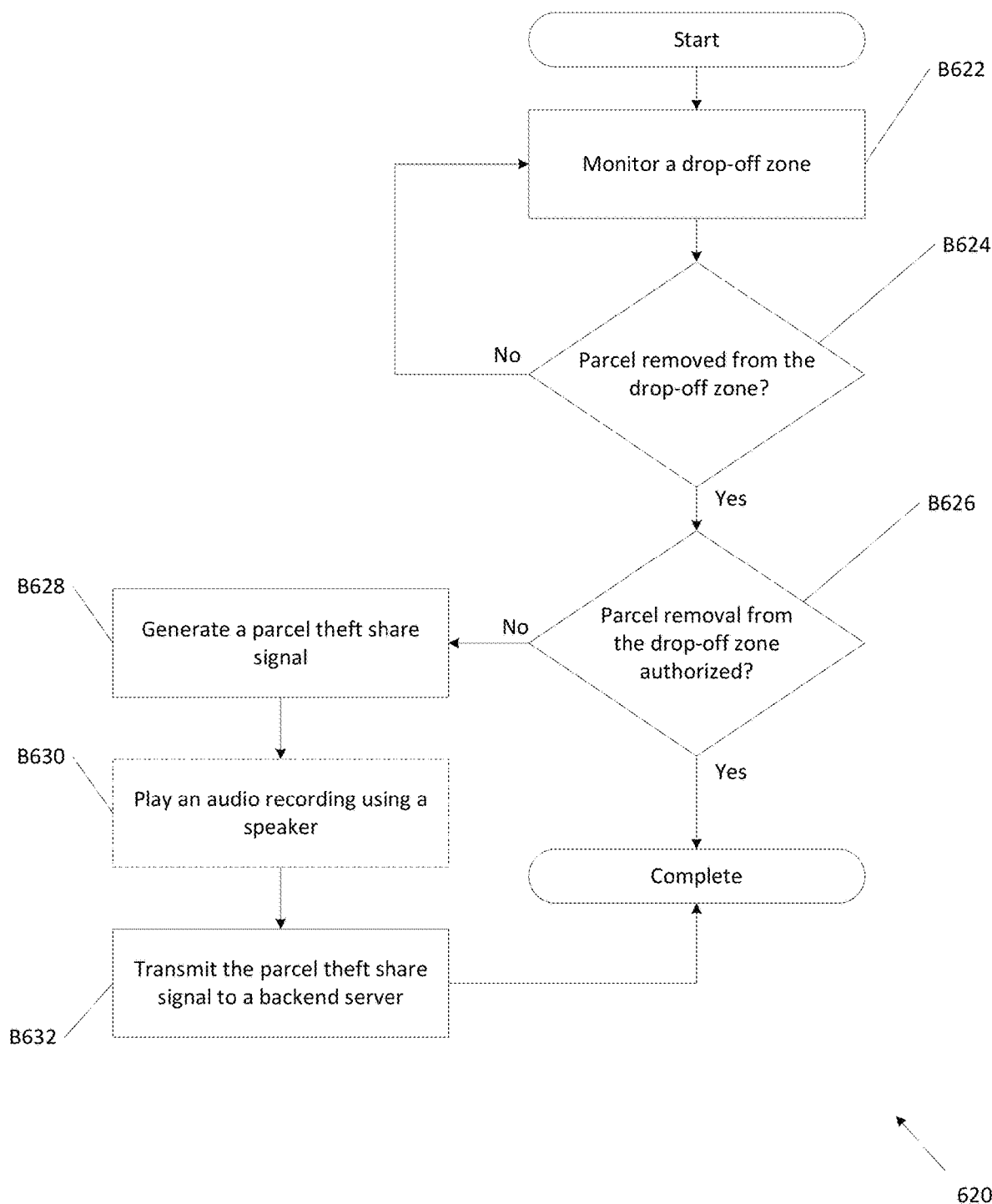
FIG. 30 is a flowchart illustrating another embodiment of a process for monitoring the drop-off zone using the first A/V recording and communication device according to an aspect of the present disclosure.

FIG. 30 is a flowchart illustrating another embodiment of a process 620 for monitoring the drop-off zone 576 using the first A/V recording and communication device 402 according to an aspect of the present disclosure. The process 620 may include capturing (block B622) first image data 460 of the drop-off zone 576 using the camera 440, where the camera 440 may be configured to have a field of view 572 that includes the drop-off zone 576, as described above. The process 620 may also include determining (block B624) when a parcel has been removed from the drop-off zone 576 using the first image data 460 of the drop-off zone 576 captured by the camera 440, as further described below. If it is determined (block B624) that the parcel has not been removed from the drop-off zone 576, then the process 620 may continue to capture (block B622) first image data 440 of the drop-off zone 576 using the camera 440. If, however, it is determined (block B624) that the parcel has been removed from the drop-off zone 576, the process 620 may include further determining (block B626) whether removal of the parcel from the drop-off zone 576 was authorized. If it is determined (block B626) that the removal of the parcel from the drop-off zone 576 was authorized, then the process 620 may be completed. However, if it is determined (block B626) that the removal of the parcel from the drop-off zone 576 was not authorized, then the process 620 may include generating (block B628) a parcel theft share signal 448, as described above. In some embodiments, the process 620 may further include playing (block B630) an audio recording, using the speaker 444 of the first A/V recording and communication device 402. The audio recording may comprise, for example, a verbal warning that the removal of the parcel from the drop-off zone 576 has been (or is being) recorded. In some embodiments, the process 620 may also include transmitting (block B632) the generated parcel theft share signal 448 to the backend server 430, using the communication module 446.

In further reference to FIG. 30, in some embodiments, the determination (block B624) that the parcel has been removed from the drop-off zone 576 may include comparing the first image data 460 of the drop-off zone 576 captured by the camera 440 at a first time and the first image data 460 of the drop-off zone 576 captured by the camera 440 at a second time after the first time. This aspect may include computer vision, or the like. Alternatively, or in addition, the determination (block B624) that the parcel has been removed from the drop-off zone 576 may include using parcel tracking data 464 such as (but not limited to) AIDC data located on or within the parcel, as described above. As also described above, the AIDC data may include (but is not limited to) barcodes, matrix codes, and bokodes. In some embodiments, the AIDC data may also include RFID data, as described above. In such embodiments, the first A/V recording and communication device 402 may include an RFID reader 447 configured to capture RFID data from an active and/or passive RFID tag located on the parcel, as described above.

Figure 31:
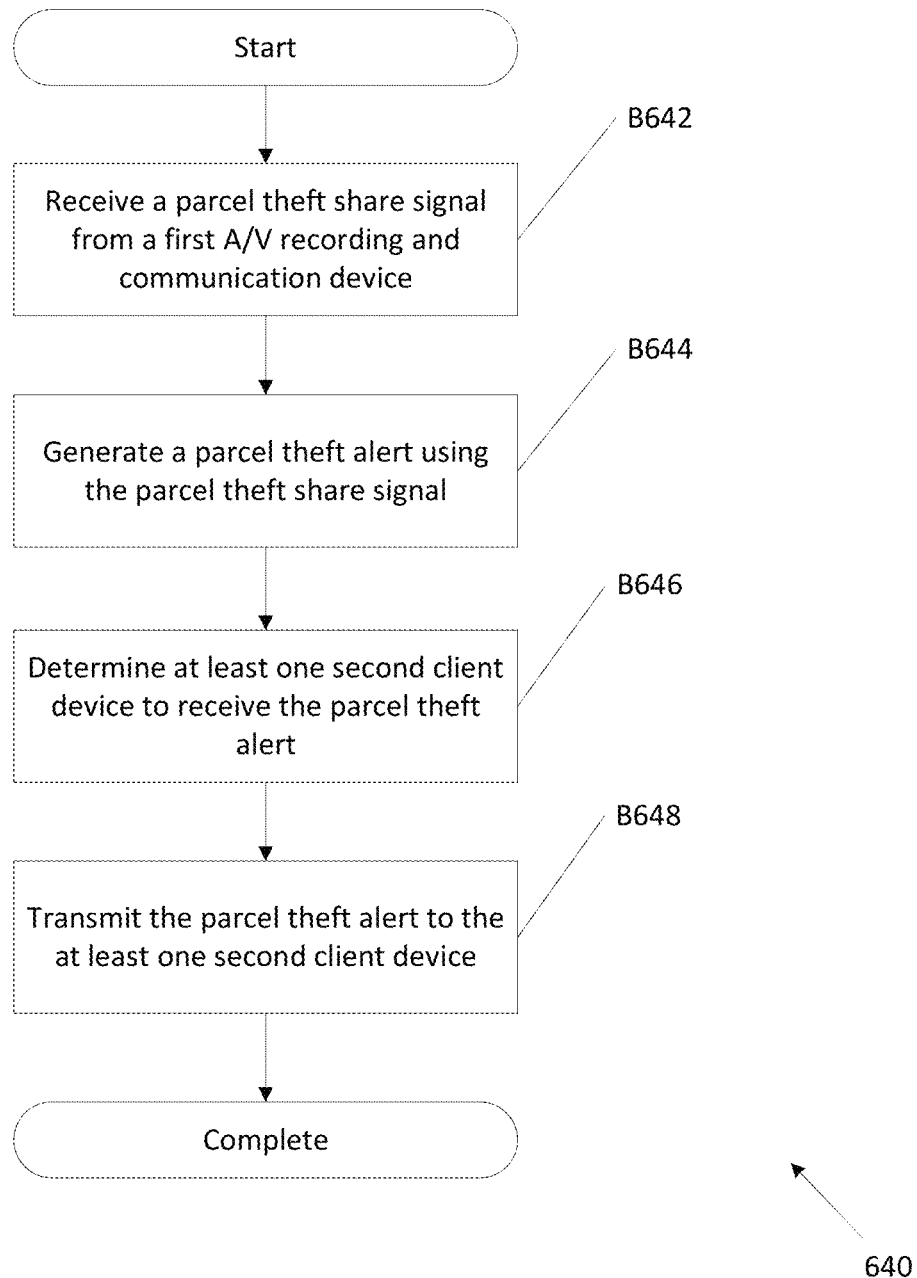
FIG. 31 is a flowchart illustrating one embodiment of a process for using a parcel theft share signal for parcel theft deterrence according to an aspect of the present disclosure.

FIG. 31 is a flowchart illustrating one embodiment of a process 640 for using a parcel theft share signal 448 for parcel theft deterrence according to an aspect of the present disclosure. The process 640 may include receiving (block B642), from a first A/V recording and communication device 402 at a backend server 430, a parcel theft share signal 448. In some embodiments, the parcel theft share signal 448 may include parcel tracking data 464 and/or first image data 460 of a drop-off zone 576 captured by a camera 440 of the first A/V recording and communication device 402. In various embodiments, the parcel theft share signal 448 may include a command to share the first image data 460 with a network of users. The process 640 may also include generating (block B644) a parcel theft alert 512 using the parcel theft share signal 448. As described above, the parcel theft share signal 448 may include the first image data 460, the first audio data 462, and/or the parcel tracking data 464. In many embodiments, the parcel theft alert 512 may include the first image data 460, the first audio data 462, and/or the parcel tracking data 464. Further, the parcel theft alert 512 may also include a geographical location of the first A/V recording and communication device 402, a time-stamp such as (but not limited to) a time when the parcel was removed from the drop-off zone 576, and/or image data of a person removing the parcel from the drop-off zone 576. In various embodiments, the geographical location of the first A/V recording and communication device 402 may be provided in the parcel theft alert 512 as an approximate location, such as by identifying only the nearest major intersection to the first A/V recording and communication device 402 and/or by identifying one or more landmarks near the first A/V recording and communication device 402.

In reference to FIG. 31, the process 640 may include determining a user, from the network of users, to receive the parcel theft alert 512. For example, the process 640 may include determining (block B646) at least one second client device(s) 414, 416, to receive the parcel theft alert 512. In many embodiments, the at least one second client device(s) 414, 416, may be associated with a second A/V recording and communication device 412, where the at least one second client device(s) 414, 416 to receive the parcel theft alert 512 may be determined based on the location of the second A/V recording and communication device 412 and the location of the first A/V recording and communication device 402, as described further in FIG. 32. For example, the at least one second client device(s) 414, 416 to receive the parcel theft alert 512 may be determined (block B646) by determining that the first A/V recording and communication device 402 is within a predefined distance from the second A/V recording and communication device 412. In addition, the process 640 may include transmitting (block B648) the parcel theft alert 512 to the least one second client device(s) 414, 416, using the network interface 519.

Figure 32:
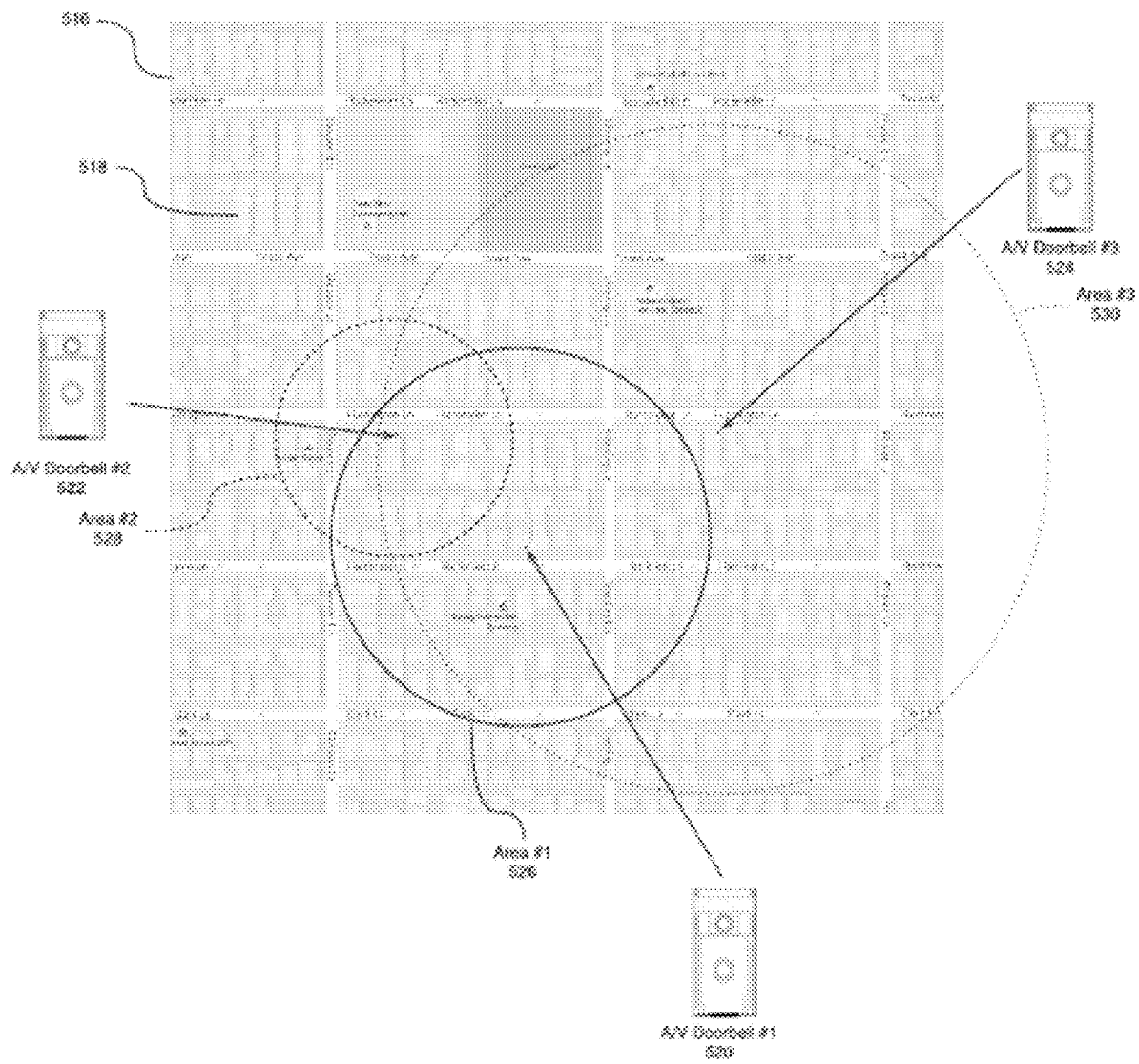
FIG. 32 is a map of a neighborhood illustrating a method for determining at least one second client device to receive the parcel theft alert according to an aspect of the present disclosure.

FIG. 32 is a map of a neighborhood 516 illustrating a method for determining (block B646) at least one second client device to receive the parcel theft alert 512 according to an aspect of the present disclosure. The neighborhood 516 may include a plurality of buildings 518, such as homes, offices, retail businesses, warehouses, etc. At least some of the buildings 518 may include A/V recording and communication devices secured to an exterior surface, such as adjacent to the front door. For example, FIG. 32 illustrates three A/V recording and communication devices (A/V Doorbell #1 520, A/V Doorbell #2 522, A/V Doorbell #3 524) associated with three different buildings. Each of the A/V doorbells 520, 522, 524 may have a defined area around it represented by the three overlapping circles (Area #1 526, Area #2 528, Area #3 530). Each circle 526, 528, 530 represents the area from which the owner/user of the A/V recording and communication device at the center of the circle will receive parcel theft alerts 512 that include shared video footage recorded by other A/V doorbells within the area including.

For example, if A/V Doorbell #1 520 records video footage and the A/V Doorbell #1 520 shares the recorded video footage using a parcel theft shared signal 448, then the owner/user of A/V Doorbell #3 524 may receive a parcel theft alert 512 (via his or her client devices) of the shared video footage because A/V Doorbell #1 520 is located within Area #3 530, but the owner/user of A/V Doorbell #2 522 may not receive a parcel theft alert 512 of the shared video footage because A/V Doorbell #1 520 is located outside of Area #2 528. In another example, if A/V Doorbell #2 522 records video footage and the owner/user of A/V Doorbell #2 522 shares the recorded video footage using a parcel theft shared signal 448, then the owners/users of A/V Doorbells #1 and #3 520, 524 may both receive (via his or her client devices) a parcel theft alert that includes the shared video footage because A/V Doorbell #2 522 is located within both Area #1 526 and Area #3 530. In another example, if A/V Doorbell #3 524 records video footage and the owner/user of A/V Doorbell #3 524 shares the recorded video footage using a parcel theft shared signal 448, then neither of the owners/users of A/V Doorbells #1 and #2 520, 522 will receive a parcel theft alert 512 of the shared video footage because A/V Doorbell #3 524 is located outside of both Area #1 526 and Area #2 528. The determinations of which owners/users will receive parcel theft alerts, and which owners/users will not receive parcel theft alerts, are summarized in the table at the bottom of FIG. 32.

Figure 33:
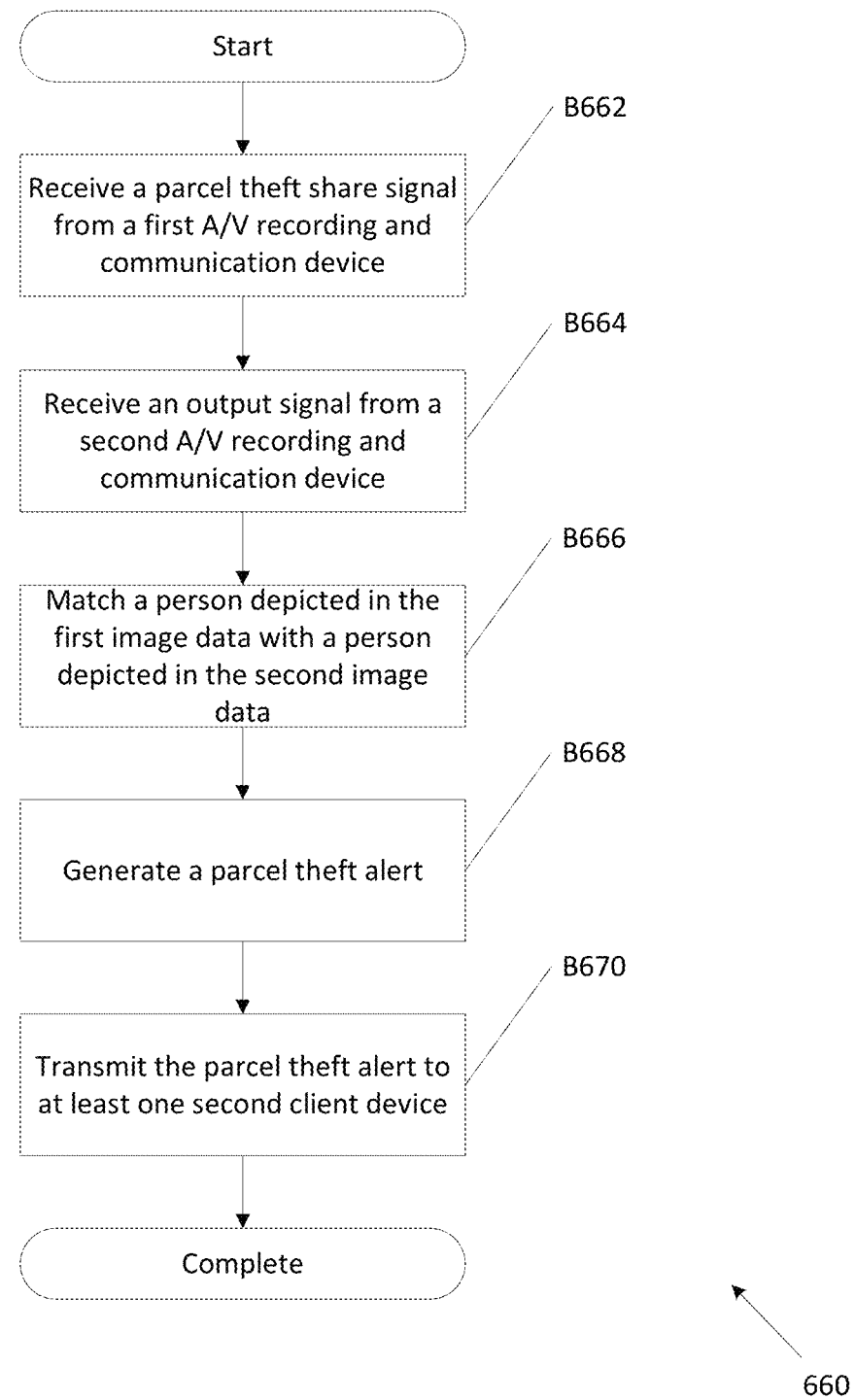
FIG. 33 is a flowchart illustrating another embodiment of a process for using a parcel theft share signal for deterring parcel theft according to an aspect of the present disclosure.

FIG. 33 is a flowchart illustrating another embodiment of a process for using a parcel theft share signal for parcel theft deterrence according to an aspect of the present disclosure. The process 660 may include receiving (block B662), from a first A/V recording and communication device 402 at a backend server 430, a parcel theft share signal 448. As described above, the parcel theft share signal 448 may include parcel tracking data 464 and/or first image data 460 of a drop-off zone 576 captured by a camera 440 of the first A/V recording and communication device 402. In various embodiments, the parcel theft share signal 448 may include a command to share the first image data 460 with a network of users. The process 660 may also include receiving (block B664) an output signal 494 from a second A/V recording and communication device 412 at the backend server 430. In some embodiments, the output signal 494 may include second image data 490 captured by a camera 470 of the second A/V recording and communication device 412 and/or second audio data 492 captured by a microphone 472 of the second A/V recording and communication device 412. Further, the process 660 may include matching (block B666) a person depicted in the first image data 460 with a person depicted in the second image data 490. In some embodiments, the matching (block B666) of the person depicted in the first image data 460 with the person depicted in the second image data 490 may be performed using a facial recognition process. In many embodiments, the person depicted in the first image data 460 may be the parcel thief, and thus matching the person depicted in the first image data 460 with the person depicted in the second image data 490 may allow for subsequently locating the parcel thief. In various embodiments, information regarding the person may be gathered such as (but not limited to) a location associated with the second A/V recording and communication device 412, a description of the person, time-stamps indicating times that the person was captured in the first image data 460 and/or the second image data 490, etc. Further, the process 660 may also include generating (block B668) a parcel theft alert 512 using the first image data 460, parcel tracking data 464, second image data 490, and/or information regarding the person. In addition, the process 660 may also include transmitting (block 670) the parcel theft alert 512 to at least one user of the network of users, such as (but not limited to) the second client device(s) 414, 416 and/or the first client device(s) 404, 406.

Figure 34:
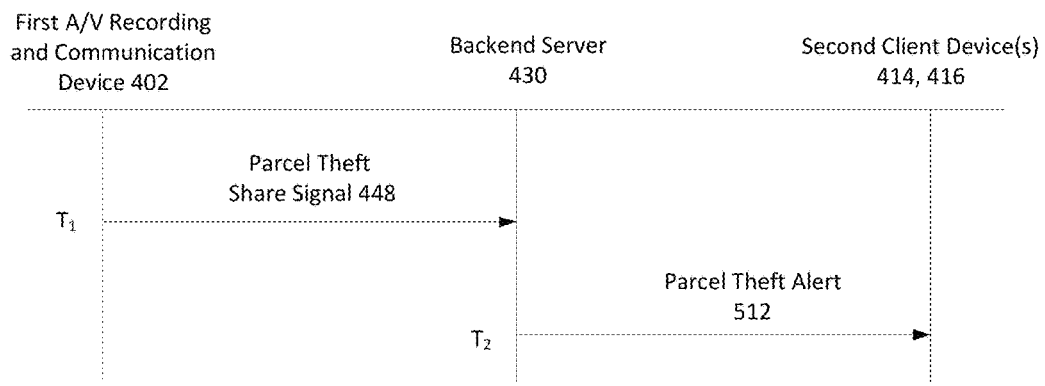
FIGS. 34 and 35 are sequence diagrams illustrating embodiments of processes for using parcel theft share signals for deterring parcel theft according to various aspects of the present disclosure.

FIG. 34 is a sequence diagram illustrating an embodiment of a process for using a parcel theft share signal 448 to deter parcel theft according to various aspects of the present disclosure. The process may include the first A/V recording and communication device 402, a backend device such as the backend server 430, and the second client device(s) 414, 416. At a time $T_1$, the first A/V recording and communication device 402 may transmit a parcel theft share signal 448 to the backend server 430, as described above. In response to receiving the parcel theft share signal 448, the backend server 430 may generate a parcel theft alert 512 and transmit the parcel theft alert 512 to one or more second client devices 414, 416 at a time $T_2$. The parcel theft alert 512 may include a variety of information to combat parcel thefts, as described above. In various embodiments, the backend server 330 may determine the one or more second client devices 414, 416 to which to transmit the parcel theft alert 512 based on the locations of the A/V recording and communication devices and the defined areas, as described above (see FIG. 32).

Figure 35:
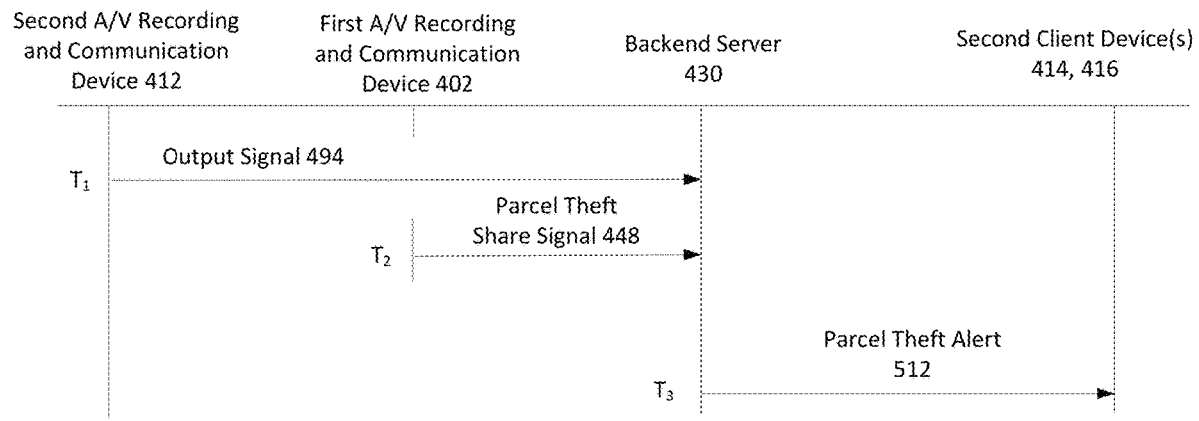

FIG. 35 is a sequence diagram illustrating another embodiment of a process for using a parcel theft share signal 448 to deter parcel theft according to various aspects of the present disclosure. The process may include the second A/V recording and communication device 412, the first A/V recording and communication device 402, a backend device such as the backend server 430, and the second client device(s) 414, 416. At time $T_1$, the process may include at least one second A/V recording and communication device 412 sending an output signal 494 to the backend server 430 that includes second image data 490 and/or second audio data 492, as described above. At a time $T_2$, the first A/V recording and communication device 402 may transmit a parcel theft share signal 448 that may include first image data 460, first audio data 462, and/or parcel tracking data 464 to the backend server 430, as described above. In response to receiving the parcel theft share signal 448, the backend server 330 may attempt to match a person depicted in the first image data 440 with a person depicted in the second image data 490 and upon finding a match, generate a parcel theft alert 512, as described above. Further, the process may also include transmitting the parcel theft alert 512 to the second client device(s) 414, 416 at a time T3. In some embodiments, the backend server 430 may receive the output signal 494 at the same time or after receiving the parcel theft share signal 448 from the first A/V recording and communication device 402. In additional embodiments, the backend server 330 may limit the second image data 490 that is used to determine a match (block B666) based on the location of the first A/V recording and communication device 402 and/or the location(s) of the at least one second A/V recording and communication device 412 that captured the second image data 490, as described above (see FIG. 32). For example, if the second A/V recording and communication device 412 is configured such that it has a defined area that excludes the first A/V recording and communication device 402, then the backend server 430 may not use an output signal 494 from such second A/V recording and communication device 412 to match (block B666) a person depicted in the first image data 460 of the parcel theft share signal 448 from the first A/V recording and communication device 402. However, if the second A/V recording and communication device 412 is configured such that it has a defined area that includes the first A/V recording and communication device 402, then the backend server 430 may use an output signal 494 from such second A/V recording and communication device 412 to match (block B666) a person depicted in the first image data 460 of the parcel theft share signal 448 from the first A/V recording and communication device 402. In further embodiments, the backend server 430 may use any and all output signals irrespective of geographic locations to match (block B666) a person depicted in the first image data 460 of the parcel theft share signal 448, as described above.

Figure 36:
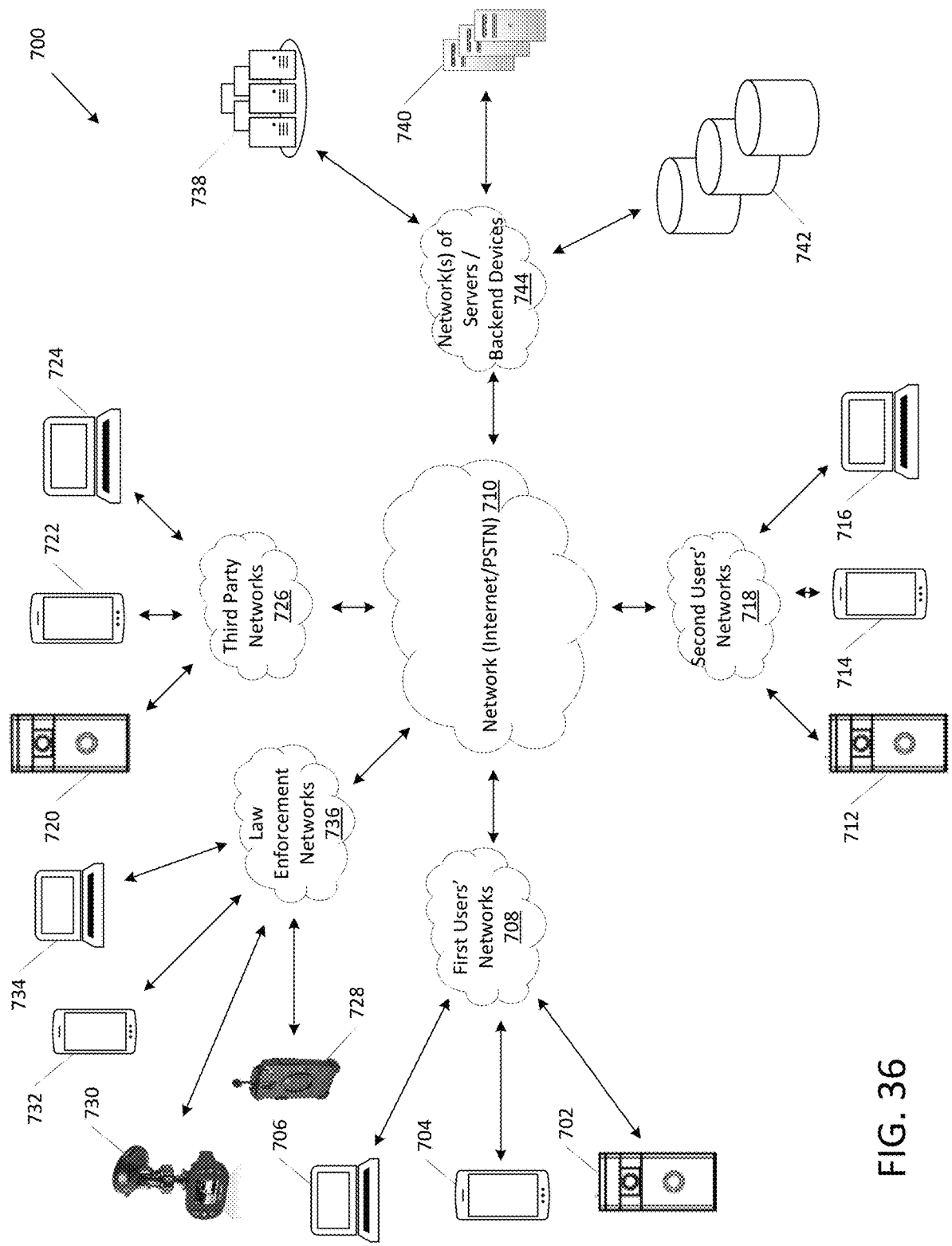
FIG. 36 is a functional block diagram illustrating a system for communicating in a network using various devices according to various aspects of the present disclosure.

FIG. 36 is a functional block diagram illustrating a system for communicating in a network using various signals. As described above, in some embodiments, the first A/V recording and communication device 402 may transmit a parcel theft share signal 448 to backend devices for generating parcel theft alerts 512. However, in other embodiments, various other devices, such as (but not limited to) third party devices, may transmit various signals that may include various data including (but not limited to) image data, audio data, and/or text data to the backend devices that may be used to generate parcel theft alerts within a network of users.

In reference to FIG. 36, the system 700 may include one or more first audio/video (A/V) recording and communication devices 702 configured to access a first users' network 708 to connect to a network (Internet/PSTN) 710. The system 700 may also include one or more first client devices 704, 706, which in various embodiments may be configured to be in network communication with the first A/V recording and communication device 702. The first client devices 704, 706 may comprise, for example, a mobile phone such as a smartphone, or a computing device such as a tablet computer, a laptop computer, a desktop computer, etc. The first client devices 704, 706 may include any or all of the components and/or functionality of the client device 114 and/or the client device 800 described herein. In some embodiments, the first client devices 704, 706 may not be associated with a first A/V recording and communication device.

In various embodiments, the system 700 may also include one or more second A/V recording and communication devices 712 connected to the network (Internet/PSTN) 710 using a second users' network 718 to access the network (Internet/PSTN) 710. The system 700 may further include one or more second client devices 714, 716, which in various embodiments may be configured to be in network communication with the second A/V recording and communication device 712. The second client devices 714, 716 may comprise, for example, a mobile phone such as a smartphone, or a computing device such as a tablet computer, a laptop computer, a desktop computer, etc. The second client devices 714, 716 may include any or all of the components and/or functionality of the client device 114 and/or the client device 800 described herein. In some embodiments, the second client devices 714, 716 may not be associated with a second A/V recording and communication device.

In some embodiments, the system 700 may also include one or more third party A/V recording and communication devices 720 connected to the network (Internet/PSTN) 710 using various third party networks 726 such as a local network, a wireless network such as a cellular/mobile network and/or a Wi-Fi network, a wired network such as an Ethernet network, a public network, a low-bandwidth network, and/or any other appropriate network to access the network (Internet/PSTN) 710. The system 700 may further include one or more third party client devices 722, 726, which in various embodiments may be configured to be in network communication with the third party A/V recording and communication device 720. The third party client devices 722, 726 may comprise, for example, a mobile phone such as a smartphone, or a computing device such as a tablet computer, a laptop computer, a desktop computer, etc. The third party client devices 722, 726 may include any or all of the components and/or functionality of the client device 114 and/or the client device 800 described herein. In some embodiments, the third party client devices 722, 726 may not be associated with a third party A/V recording and communication device.

With further reference to FIG. 36, the system 700 may also include law enforcement A/V recording and communication devices 728, 730 connected to the network (Internet/PSTN) 710 using a law enforcement network 736 such as a local network, a wireless network such as a cellular/mobile network and/or a Wi-Fi network, a wired network such as an Ethernet network, a public network, a low-bandwidth network, and/or any other appropriate network to access the network (Internet/PSTN) 710. In addition, the law enforcement A/V recording and communication devices 728, 730 may be configured to capture image data, audio data, and/or text data and be associated with law enforcement client devices 732, 734. In the illustrated embodiment, the law enforcement A/V recording and communication devices include a body camera 728 and a dashboard camera 730, but the illustrated devices are only examples and are not limiting.

In further reference to FIG. 36, the system 700 may also include various backend devices such as (but not limited to) storage devices 742, backend servers 740, and backend APIs 738 in network communication with the law enforcement A/V recording and communication devices 728, 730, the first and second A/V recording and communication devices 702, 712, and the third party A/V recording and communication devices 720. Further, the various backend devices 738, 740, 742 may be in network communication with the law enforcement client devices 732, 734, the first client devices 704, 706, the second client devices 714, 716, and the third party client devices 722, 724. In some embodiments, the storage devices 742 may be a separate device from the backend servers 740 (as illustrated) or may be an integral component of the backend servers 740. In addition, the first users' network 708 and the network 710 may be similar in structure and/or function to the user's network 408 and the network 410 (FIG. 24), respectively. As described above, the backend devices such as the backend servers 740 may be configured to receive a parcel theft share signal from the first A/V recording and communication device 702 to generate a parcel theft alert within a network of devices as illustrated in FIG. 36. Further, the backend devices such as the backend servers 740 may also be configured to receive and process various signals from any A/V recording and communication device, such as the third party A/V recording and communication device 720 and/or the law enforcement A/V recording and communication devices 728, 730, using the processes described above. In addition, the backend devices such as the backend server 740 may receive the various signals from third party client devices 722, 724, and law enforcement client devices 732, 734. In some embodiments, the backend devices such as the backend server 740 may receive the various signals from third party social networks that may include any social media service or platform that uses computer-mediated tools that allow participants to create, share, and/or exchange information in virtual communities and/or networks, such as (but not limited to) social networking websites and/or applications running on participant devices. Non-limiting examples of social networks include NEXTDOOR®, FACEBOOK®, INSTAGRAM®, SNAPCHAT®, TWITTER®, etc. In some embodiments, the backend devices such as the backend server 740 may receive the various signals from third parties, such as the general public, where a member of the public may transmit a signal that includes information about an event that the member of the public witnessed, such as (but not limited to) a possible crime using their third party device 722, such as, but not limited to, a smartphone, where the signal transmitted by the member of the public may include image data, audio data, and/or text data. In various embodiments, the backend server 740 may use any signal received from any source to generate parcel theft alerts, as described above.

FIG. 37 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 37, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 38:
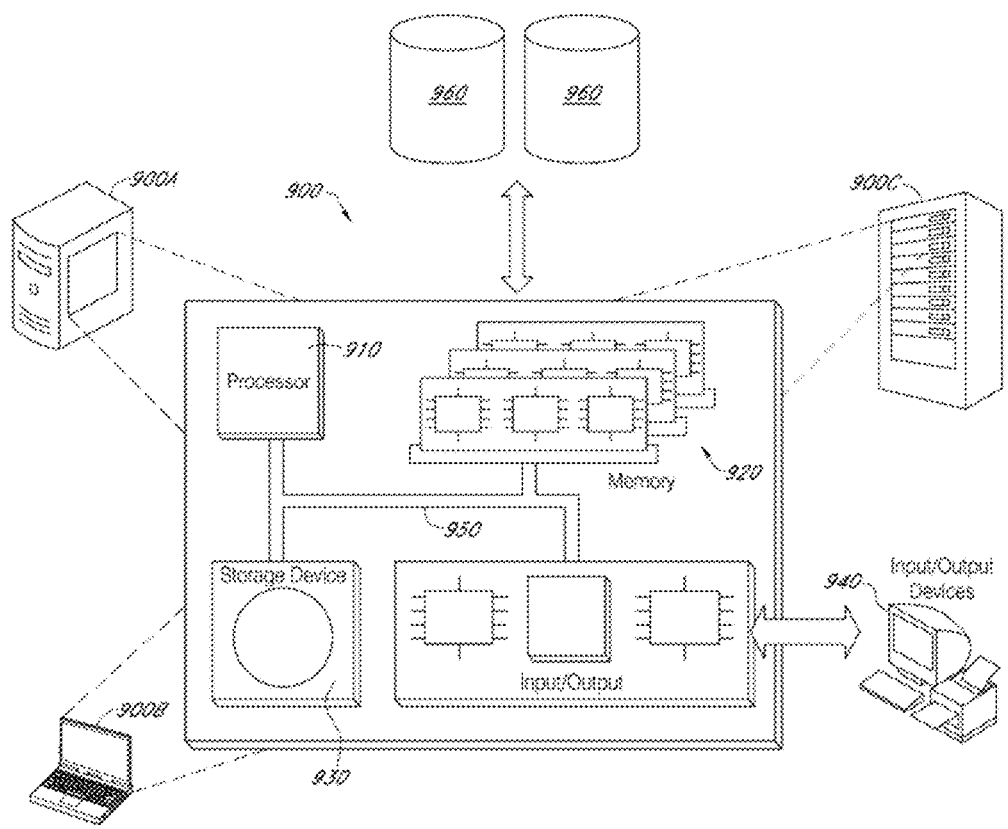
FIG. 38 is a functional block diagram of a general-purpose computing system on which the present embodiments may be implemented according to various aspects of present disclosure.

FIG. 38 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, an audio/video (A/V) recording and communication device comprises: a camera configured to capture first image data of a drop-off zone; a communication module; and a processing module operatively connected to the camera and the communication module, wherein the processing module is in network communication with a backend server via the communication module, the processing module comprising: a processor; and a parcel theft deterrence application, wherein the parcel theft deterrence application configures the processor to: monitor a parcel in the drop-off zone, wherein the parcel is associated with parcel tracking data; determine that the parcel has been removed from the drop-off zone; generate a parcel theft share signal using the first image data and the parcel tracking data, wherein the parcel theft share signal includes a command to share the first image data with a network of users; and transmit the parcel theft share signal to the backend server using the communication module.

In an embodiment of the first aspect, the parcel theft deterrence application further configures the processor to monitor the parcel in the drop-off zone by determining when the parcel has been placed in the drop-off zone using the first image data of the drop-off zone captured by the camera.

In another embodiment of the first aspect, the parcel theft deterrence application further configures the processor to determine that the parcel has been removed from the drop-off zone using the first image data of the drop-off zone captured by the camera.

In another embodiment of the first aspect, the parcel tracking data comprises automatic identification and data capture (AIDC) data.

In another embodiment of the first aspect, the AIDC data comprises, a barcode, a matrix code, or a bokode.

In another embodiment of the first aspect, the parcel theft deterrence application further configures the processor to determine that the parcel has been removed from the drop-off zone using the AIDC data.

In another embodiment of the first aspect, the A/V recording and communication device further comprises a radio-frequency identification (RFID) reader, wherein the RFID reader is operatively connected to the processing module and is configured to capture RFID data from a RFID tag located on the parcel.

In another embodiment of the first aspect, the parcel theft deterrence application further configures the processor to determine that the parcel has been removed from the drop-off zone by using the RFID data.

In another embodiment of the first aspect, the parcel theft deterrence application further configures the processor to determine whether removal of the parcel from the drop-off zone was authorized.

In another embodiment of the first aspect, the parcel theft deterrence application further configures the processor to generate the parcel theft share signal upon a determination that the removal of the parcel from the drop-off zone was not authorized.

In a second aspect, a method for communicating in a network is provided, the method comprising: receiving, from a first audio/video (A/V) recording and communication device, at a backend server in network communication with the first A/V recording and communication device, a parcel theft share signal including parcel tracking data and first image data captured by a camera of the first A/V recording and communication device, the parcel theft share signal including a command to share the first image data with a network of users; generating a parcel theft alert using the first image data; and determining at least one second client device associated with a second A/V recording and communication device to receive the parcel theft alert; and transmitting the parcel theft alert to the at least one second client device associated with a second A/V recording and communication device, by the backend server, using a network interface.

In an embodiment of the second aspect, the parcel theft alert includes first audio data captured by a microphone of the first A/V recording and communication device.

In another embodiment of the second aspect, the parcel theft alert includes a geographical location of the first A/V recording and communication device.

In another embodiment of the second aspect, the parcel theft alert includes image data of a person removing a parcel from a drop-off zone.

In another embodiment of the second aspect, the method further comprises determining the at least one second client device to receive the parcel theft alert by determining that the first A/V recording and communication device is within a predefined distance from the second A/V recording and communication device.

In another embodiment of the second aspect, the method further comprises transmitting the parcel theft alert signal from the backend server to a law enforcement agency.

In another embodiment of the second aspect, the method further comprises receiving, at the backend server from a second A/V recording and communication device in network communication with the backend server, an output signal including second image data captured by a camera of the second A/V recording and communication device; matching a person depicted in the first image data with a person depicted in the second image data; and generating the parcel theft alert using the first image data and information regarding the person.

In another embodiment of the second aspect, the method further comprises transmitting the parcel theft alert to a second client device associated with the second A/V recording and communication device.

In another embodiment of the second aspect, the matching the person depicted in the first image data with the person depicted in the second image data is performed using a facial recognition process.

In another embodiment of the second aspect, the information regarding the person includes a location associated with the second A/V recording and communication device.

In a third aspect, a method for a backend device for reporting parcel theft to one or more client devices coupled to a network is provided, the method comprising: receiving, at the backend device, a parcel theft signal from a first audio/video (A/V) recording and communication device connected to the network, the parcel theft signal comprising image data captured by a camera of the first A/V recording and communication device; generating a parcel theft alert comprising the image data; identifying at least one client device associated with a second A/V recording and communication device connected to the network; and transmitting the parcel theft alert to the at least one client device to report the parcel theft.

In an embodiment of the third aspect, receiving the parcel theft signal comprises receiving the parcel theft signal when the first A/V recording and communication device determines that a parcel has been removed from an area about the first A/V recording and communication device In another embodiment of the third aspect, the image data comprises one or more images of a person removing the parcel from the area about the first A/V recording and communication device.

In another embodiment of the third aspect, the parcel theft alert further comprises parcel tracking data associated with a parcel removed from a field of view of the camera of the first A/V recording and communication device.

In another embodiment of the third aspect, the parcel theft alert further comprises a geographical location of the first A/V recording and communication device.

In another embodiment of the third aspect, identifying the at least one client device comprises determining that the second A/V recording and communication device is within a predefined distance from the first A/V recording and communication device.

In another embodiment of the third aspect, the method further comprises transmitting the parcel theft alert to at least one law enforcement agency.

In another embodiment of the third aspect, the image data is first image data depicting a first person, the method further comprises: receiving, at the backend device, an output signal from a third A/V recording and communication device coupled to the network, the output signal comprising second image data captured by a camera of the third A/V recording and communication device; and matching the first person depicted in the first image data with a second person depicted in the second image data.

In another embodiment of the third aspect, generating the parcel theft alert comprises including the first and second image data in the parcel theft alert.

In another embodiment of the third aspect, the at least one client device is a first client device, the method further comprising transmitting the parcel theft alert to a second client device associated with the third A/V recording and communication device.

In another embodiment of the third aspect, the matching the first person with the second person comprises performing a facial recognition process on the first and second persons.

In another embodiment of the third aspect, the output signal further comprises a geographical location of the second A/V recording and communication device.

In another embodiment of the third aspect, the network comprises a plurality of A/V recording and communication devices located within a particular neighborhood.

In a fourth aspect, a non-transitory machine-readable medium of a backend device storing a program for reporting parcel theft to one or more client devices coupled to a network is provided, the program executable by at least one processing unit of the backend device, the program comprising sets of instructions for: receiving, at the backend device, a parcel theft signal from a first audio/video (A/V) recording and communication device connected to the network, the parcel theft signal comprising image data captured by a camera of the first A/V recording and communication device; generating a parcel theft alert comprising the image data; identifying at least one client device associated with a second A/V recording and communication device connected to the network; and transmitting the parcel theft alert to the at least one client device to report the parcel theft.

In an embodiment of the fourth aspect, the set of instructions for receiving the parcel theft signal comprises a set of instructions for receiving the parcel theft signal when the first A/V recording and communication device determines that a parcel has been removed from an area about the first A/V recording and communication device.

In another embodiment of the fourth aspect, the image data comprises one or more images of a person removing the parcel from the area about the first A/V recording and communication device.

In another embodiment of the fourth aspect, the parcel theft alert further comprises parcel tracking data associated with a parcel removed from a field of view of the camera of the first A/V recording and communication device.

In another embodiment of the fourth aspect, the parcel tracking data comprises automatic identification and data capture (AIDC) data.

In another embodiment of the fourth aspect, the set of instructions for identifying the at least one client device comprises a set of instructions for determining that the second A/V recording and communication device is within a predefined distance from the first A/V recording and communication device in a particular neighborhood.

In another embodiment of the fourth aspect, the network comprises a plurality of A/V recording and communication devices including the first and second A/V recording and communication devices located within the particular neighborhood.

In a fifth aspect, a method for at least one server for reporting a parcel theft in a network of users is provided, the method comprising: receiving, at the server(s), a parcel theft signal comprising image data captured by a camera of a first audio/video (A/V) recording and communication device (A/V device), wherein the first A/V device is associated with a first client device; generating a parcel theft alert comprising the image data captured by the camera of the first A/V device; determining at least one second client device to receive the parcel theft alert; and transmitting the parcel theft alert to the at least one second client device to report the parcel theft.

In an embodiment of the fifth aspect, receiving the parcel theft signal comprises receiving the parcel theft signal when a parcel has been removed from an area about the first A/V device.

In another embodiment of the fifth aspect, the image data comprises one or more images of a person removing the parcel from the area about the first A/V device.

In another embodiment of the fifth aspect, the parcel theft alert further comprises parcel tracking data associated with the parcel removed from the area about the first A/V device.

In another embodiment of the fifth aspect, the at least one second client device is associated with a second A/V device.

In another embodiment of the fifth aspect, determining the at least one second client device to receive the parcel theft alert further comprises determining a first location associated with the first A/V device and a second location associated with the second A/V device.

In another embodiment of the fifth aspect, determining the at least one second client device to receive the parcel theft alert further comprises determining that the first location associated with the first A/V device is within a predefined distance from the second location associated with the second A/V device.

In another embodiment of the fifth aspect, receiving the parcel theft signal comprises receiving the parcel theft signal from the first client device.

In another embodiment of the fifth aspect, receiving the parcel theft signal comprises receiving the parcel theft signal from the first A/V device.

In another embodiment of the fifth aspect, the network of users is associated with a plurality of A/V devices located within a neighborhood.

In a sixth aspect, a program, stored in a non-transitory machine-readable medium of an electronic device, for reporting a parcel theft in a network of users is provided, the program executable by at least one processing unit of the electronic device, the program comprising instructions for: receiving, at the electronic device, a parcel theft signal comprising image data captured by a camera of a first audio/video (A/V) recording and communication device (A/V device), wherein the first A/V device is associated with a first client device and is located at a first location; generating a parcel theft alert comprising the image data captured by the camera of the first A/V device; determining at least one second client device, associated with a second A/V device, to receive the parcel theft alert, wherein the second A/V device is located at a second location; and transmitting the parcel theft alert to the at least one second client device.

In an embodiment of the sixth aspect, the instructions for receiving the parcel theft signal further comprise instructions for receiving the parcel theft signal when a parcel has been removed from an area about the first A/V device.

In another embodiment of the sixth aspect, the image data comprises one or more images of a person removing the parcel from the area about the first A/V device.

In another embodiment of the sixth aspect, the parcel theft alert further comprises parcel tracking data associated with the parcel removed from the area about the first A/V device.

In another embodiment of the sixth aspect, the parcel theft signal further comprises the first location of the first A/V device.

In another embodiment of the sixth aspect, the instructions for determining the at least one second client device to receive the parcel theft alert further comprise instructions for determining the first location of the first A/V device and the second location of the second A/V device.

In another embodiment of the sixth aspect, the instructions for determining the at least one second client device to receive the parcel theft alert further comprise instructions for determining that the first location of the first A/V device is within a predefined distance from the second location of the second A/V device.

In another embodiment of the sixth aspect, the instructions for receiving the parcel theft signal comprise instructions for receiving the parcel theft signal from a first client device associated with the first A/V device.

In another embodiment of the sixth aspect, the instructions for receiving the parcel theft signal comprise instructions for receiving the parcel theft signal from the first A/V device.

In another embodiment of the sixth aspect, the network of users is associated with a plurality of A/V devices located within a neighborhood.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
receiving, at one or more servers, image data generated by a camera of a first audio/video (A/V) recording and communication device (A/V device), the image data representing one or more images of a parcel theft, wherein the first A/V device is associated with a first client device;
generating a parcel theft alert comprising the image data generated by the camera of the first A/V device;
determining that a second client device is associated with a second A/V device; and
transmitting the parcel theft alert to the second client device.

2. The method of claim 1, wherein receiving the image data comprises receiving the image data after a parcel has been removed from an area about the first A/V device.

3. The method of claim 1, further comprising receiving parcel tracking data associated with a parcel, the parcel being associated with the parcel theft.

4. The method of claim 1, further comprising:
determining a first location associated with the first A/V device; and
determining a second location associated with the second A/V device.

5. The method of claim 4, further comprising:
determining that the first location is within a predefined distance from the second location; and
determining that the second client device is to receive the parcel theft alert based at least in part on the first location being within the predefined distance from the second location.

6. The method of claim 1, further comprising receiving a parcel theft signal from the first client device.

7. The method of claim 1, further comprising receiving a parcel theft signal from the first A/V device.

8. The method of claim 1, the further comprising:
determining that the first A/V device is associated with a network of users; and
determining that the second A/V device is associated with the network of users.

9. One or more non-transitory computer-readable media storing instructions that, when executed by one or more processors, cause a system to perform operations comprising:
receiving image data generated by a camera of a first audio/video (A/V) recording and communication device (A/V device), wherein the first A/V device is associated with a first location;
generating a parcel theft alert comprising the image data generated by the camera of the first A/V device;
determining at least a client device, associated with a second A/V device, to receive the parcel theft alert, wherein the second A/V device is associated with a second location; and
transmitting the parcel theft alert to the client device.

10. The one or more non-transitory computer-readable media of claim 9, storing further instructions that, when executed by the one or more processors, cause the system to perform further operations comprising receiving a parcel theft signal when a parcel has been removed from an area about the first A/V device.

11. The one or more non-transitory computer-readable media of claim 9, wherein the image data represents one or more images of a person removing a parcel from an area about the first A/V device.

12. The one or more non-transitory computer-readable media of claim 9, storing further instructions that, when executed by the one or more processors, cause the system to perform further operations comprising receiving parcel tracking data associated with a parcel removed from an area about the first A/V device.

13. The one or more non-transitory computer-readable media of claim 9, storing further instructions that, when executed by the one or more processors, cause the system to perform further operations comprising receiving location data representing the first location of the first A/V device.

14. The one or more non-transitory computer-readable media of claim 9, storing further instructions that, when executed by the one or more processors, cause the system to perform further operations comprising:
determining the first location associated with the first A/V device; and
determining the second location associated with the second A/V device.

15. The one or more non-transitory computer-readable media of claim 9, storing further instructions that, when executed by the one or more processors, cause the system to perform further operations comprising determining that the first location associated with the first A/V device is within a predefined distance from the second location associated with the second A/V device.

16. The one or more non-transitory computer-readable media of claim 9, storing further instructions that, when executed by the one or more processors, cause the system to perform further operations comprising receiving a parcel theft signal from an additional client device associated with the first A/V device.

17. The one or more non-transitory computer-readable media of claim 9, storing further instructions that, when executed by the one or more processors, cause the system to perform further operations comprising receiving a parcel theft signal from the first A/V device.

18. The one or more non-transitory computer-readable media of claim 9, storing further instructions that, when executed by the one or more processors, cause the system to perform further operations comprising determining that a network of users is associated with a plurality of A/V devices located within a geographic area, the plurality of A/V devices including at least the first A/V device and the second A/V device.

19. A method comprising:
receiving image data generated by a camera of a first audio/video (A/V) recording and communication device (A/V device), the image data representing one or more images of a parcel theft, wherein the first A/V device is associated with a first location;
generating a parcel theft alert comprising the image data generated by the camera of the first A/V device;
determining that a second client device is associated with a second location; and
after determining that the second client device is associated with the second location, transmitting the parcel theft alert to the second client device.

20. The method as recited in claim 19, further comprising:
determining that the second location is within a predefined distance to the first location,
wherein transmitting the parcel theft alert to the second client device further occurs after determining that the second location is within the predefined distance to the first location.

* * * * *

UNITED STATES PATENT AND TRADEMARK OFFICE
CERTIFICATE OF CORRECTION

| | | |
|---|---|---|
| PATENT NO. | : 10,762,754 B2 | Page 1 of 1 |
| APPLICATION NO. | : 16/240735 | |
| DATED | : September 1, 2020 | |
| INVENTOR(S) | : James Siminoff et al. | |

It is certified that error appears in the above-identified patent and that said Letters Patent is hereby corrected as shown below:

In the Claims

Column 51, Line 20, change "the further" to --further--.

Signed and Sealed this
Thirteenth Day of October, 2020

Andrei Iancu
*Director of the United States Patent and Trademark Office*